(12) United States Patent
Wenren et al.

(10) Patent No.: US 11,092,770 B2
(45) Date of Patent: Aug. 17, 2021

(54) CAMERA LENS GROUP

(71) Applicant: ZHEJIANG SUNNY OPTICAL CO., LTD., Ningbo (CN)

(72) Inventors: Jianke Wenren, Ningbo (CN); Ming Li, Ningbo (CN); Saifeng Lyu, Ningbo (CN); Lihui Ye, Ningbo (CN)

(73) Assignee: ZHEJIANG SUNNY OPTICAL CO., LTD.

( * ) Notice: Subject to any disclaimer, the term of this patent is extended or adjusted under 35 U.S.C. 154(b) by 302 days.

(21) Appl. No.: 16/273,839

(22) Filed: Feb. 12, 2019

(65) Prior Publication Data

US 2019/0170966 A1 Jun. 6, 2019

Related U.S. Application Data

(63) Continuation of application No. PCT/CN2018/085638, filed on May 4, 2018.

(30) Foreign Application Priority Data

Sep. 21, 2017 (CN) .......................... 201710860093.9
Sep. 21, 2017 (CN) .......................... 201721215393.3

(51) Int. Cl.
*G02B 7/02* (2021.01)
*G02B 27/00* (2006.01)
*G02B 9/64* (2006.01)
*G02B 13/00* (2006.01)
*H04N 5/225* (2006.01)

(52) U.S. Cl.
CPC ................ *G02B 7/021* (2013.01); *G02B 9/64* (2013.01); *G02B 13/0045* (2013.01); *G02B 27/0025* (2013.01); *H04N 5/2254* (2013.01)

(58) Field of Classification Search
CPC ................ G02B 7/021; G02B 13/0045; G02B 27/0025; G02B 9/64; H04N 5/2254
USPC .......................................................... 359/819
See application file for complete search history.

(56) References Cited

U.S. PATENT DOCUMENTS 9,810,882 B2 * 11/2017 Chen .................... G02B 9/64
2017/0003482 A1 * 1/2017 Chen .................... H04N 5/225
2017/0357081 A1   12/2017 Dai et al.
(Continued)

FOREIGN PATENT DOCUMENTS

CN       104597582 A    5/2015
CN       106324811 A    1/2017
CN       107015347 A    8/2017
(Continued)

*Primary Examiner* — Mohammed A Hasan
(74) *Attorney, Agent, or Firm* — Barnes & Thornburg LLP

(57) ABSTRACT

A camera lens group is disclosed. The camera lens group includes, sequentially from an object side to an image side along an optical axis: a first lens, a second lens, a third lens, a fourth lens, a fifth lens, a sixth lens, and a seventh lens having refractive powers. The second lens has a positive refractive power. An object-side surface of the second lens, an object-side surface of the third lens, and an object-side surface of the sixth lens are a convex surface. An image-side surface of the third lens, an image-side surface of the sixth lens, and an image-side surface of the seventh lens are a concave surface. A center thickness CT4 of the fourth lens on the optical axis and a center thickness CT5 of the fifth lens on the optical axis satisfy: CT4/CT5>1.5.

17 Claims, 18 Drawing Sheets

(56) References Cited

U.S. PATENT DOCUMENTS

2018/0188482 A1 7/2018 Jhang et al.
2018/0364454 A1* 12/2018 Yang .................. G02B 13/0045

FOREIGN PATENT DOCUMENTS

| CN | 107102425 A | 8/2017 |
| CN | 107490841 A | 12/2017 |

* cited by examiner

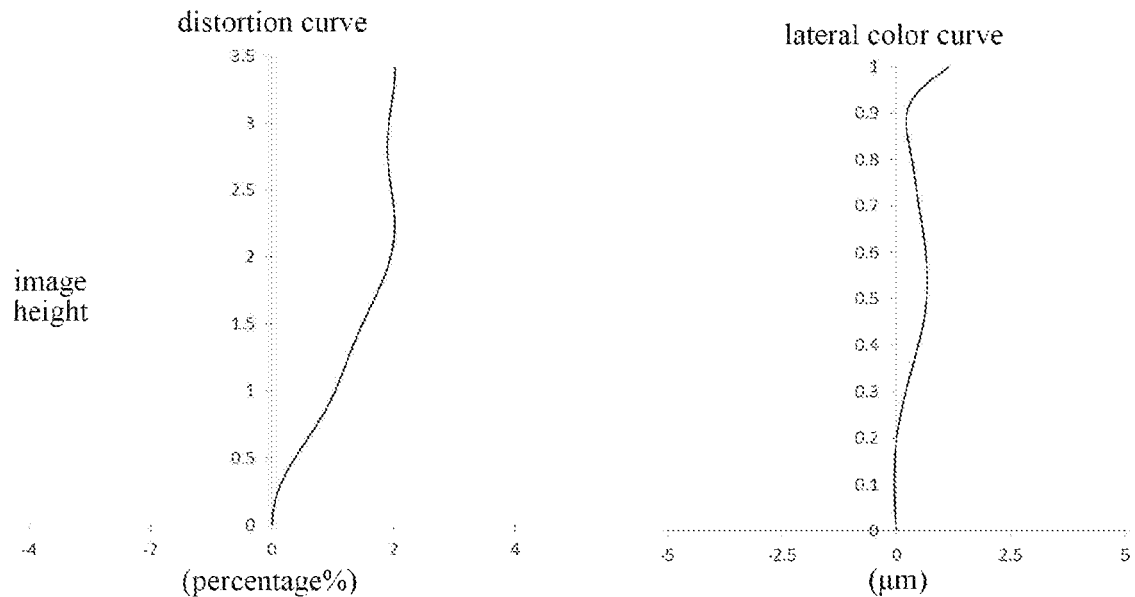
Fig. 2C
Fig. 2D
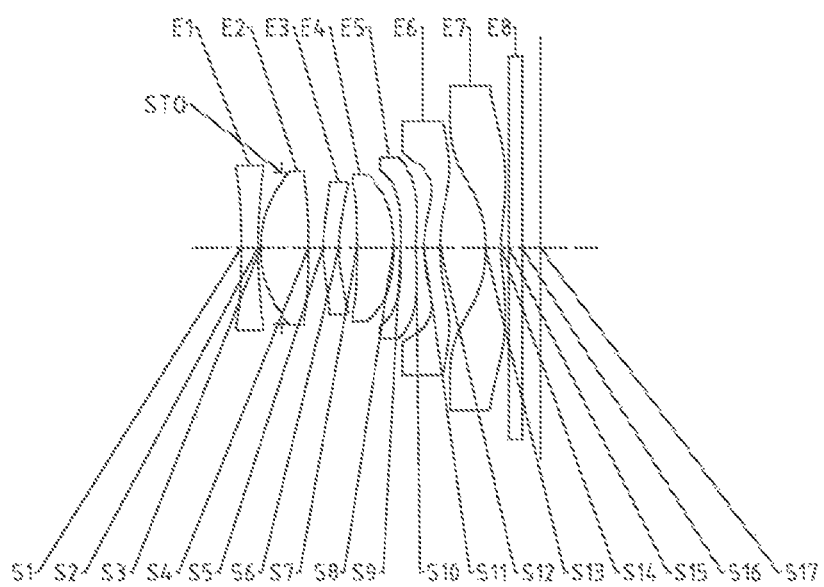
Fig. 3

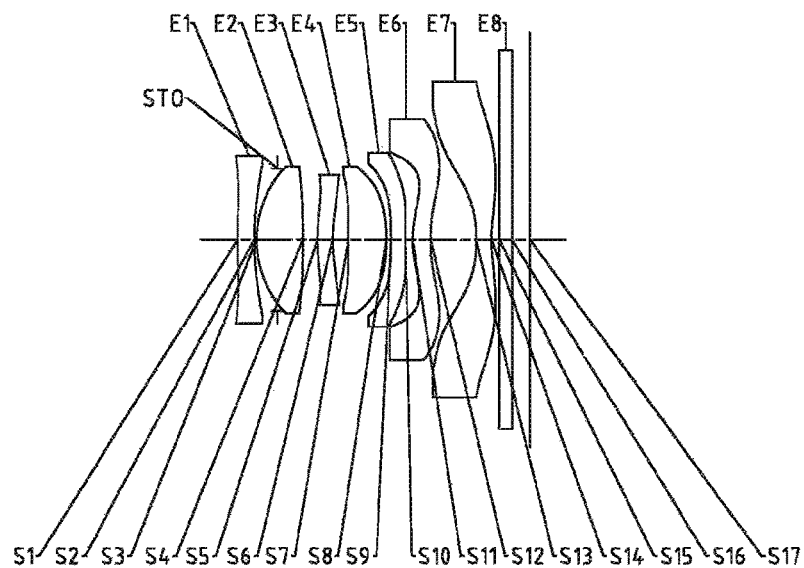
Fig. 5
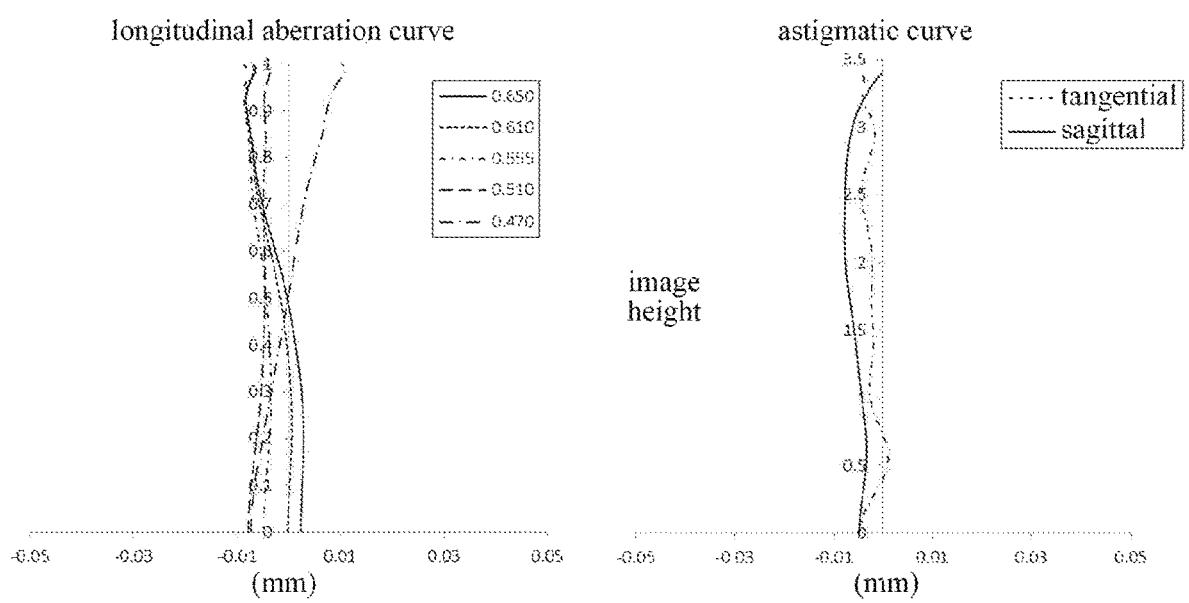
Fig. 6A
Fig. 6B

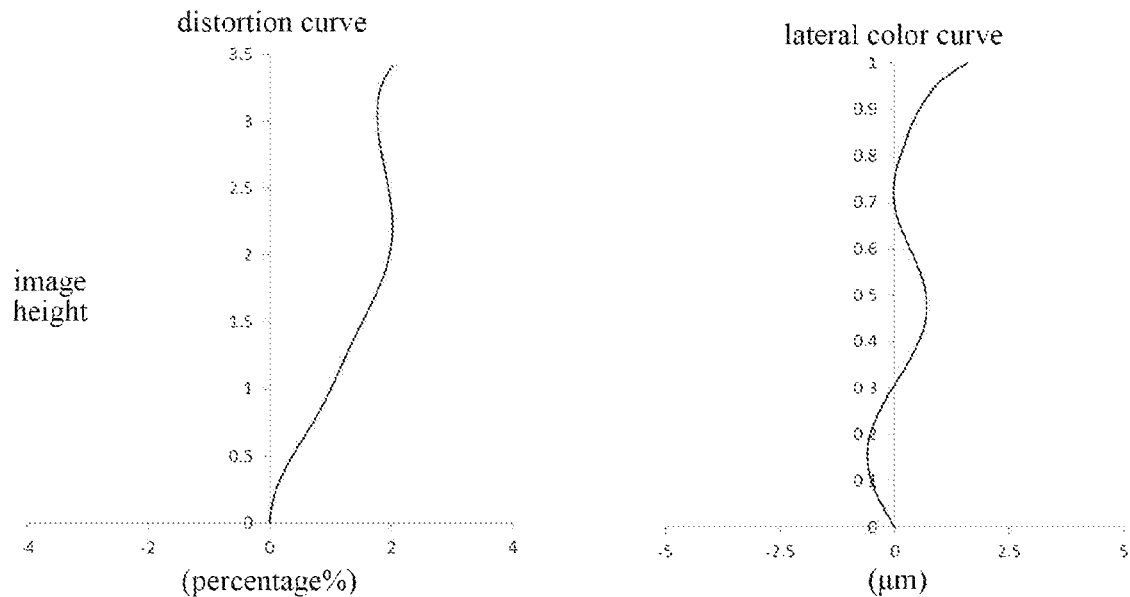
Fig. 10C
Fig. 10D
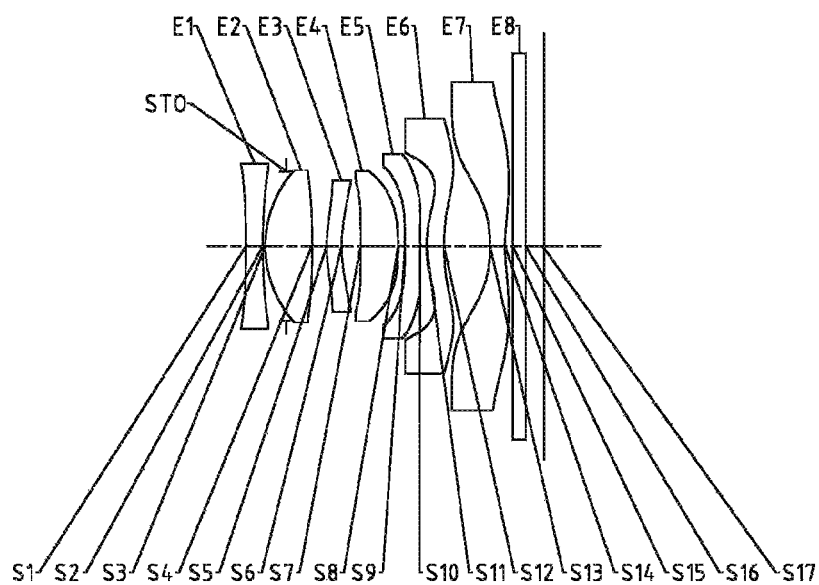
Fig. 11

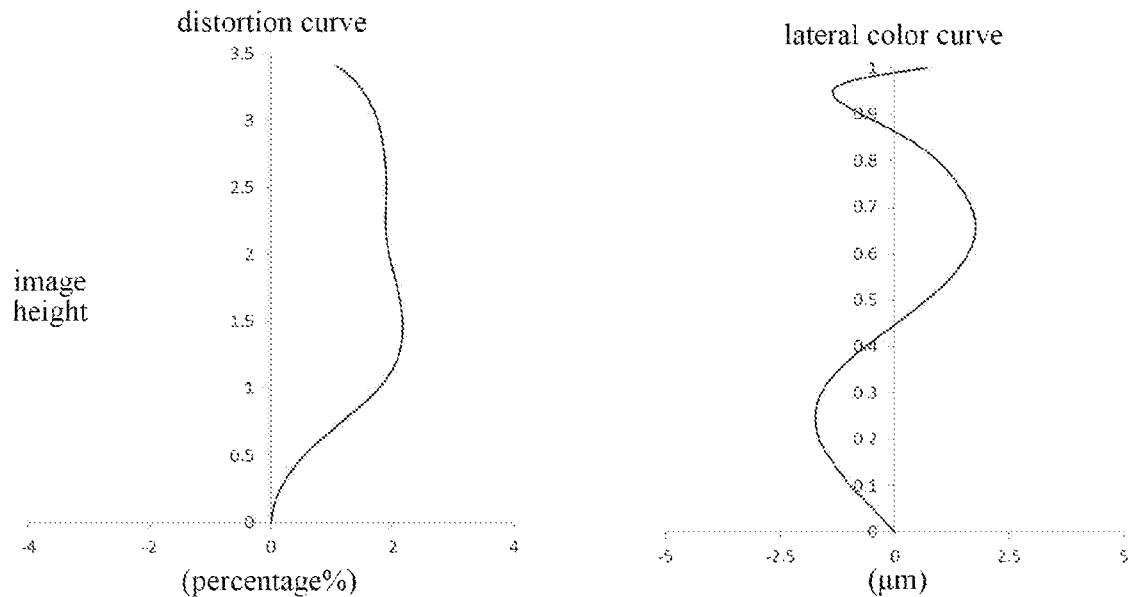
Fig. 18C
Fig. 18D
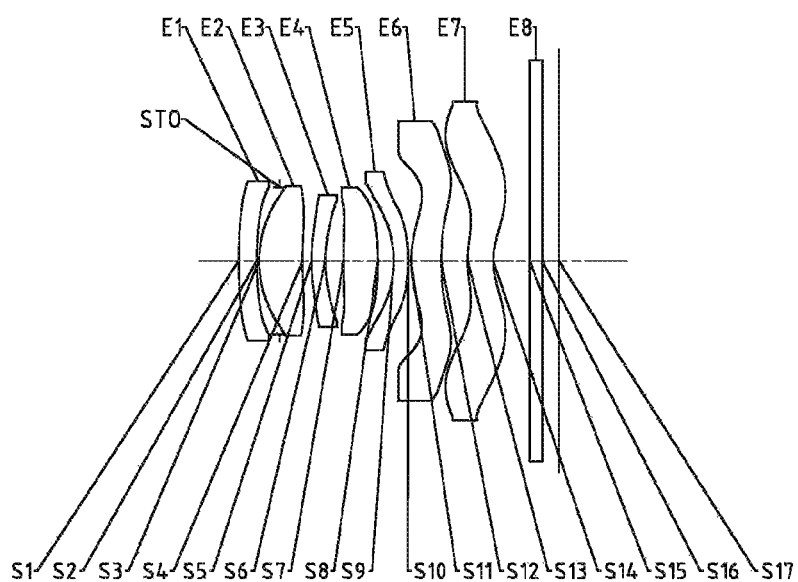
Fig. 19

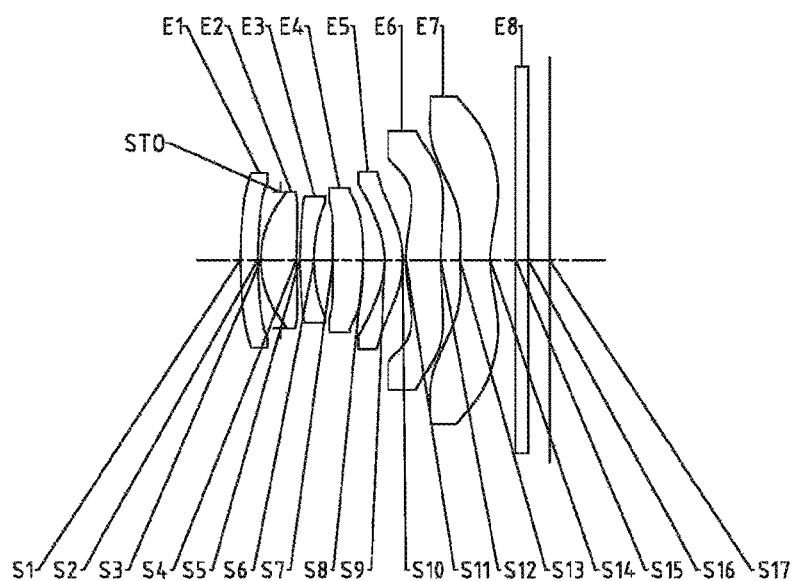
Fig. 21
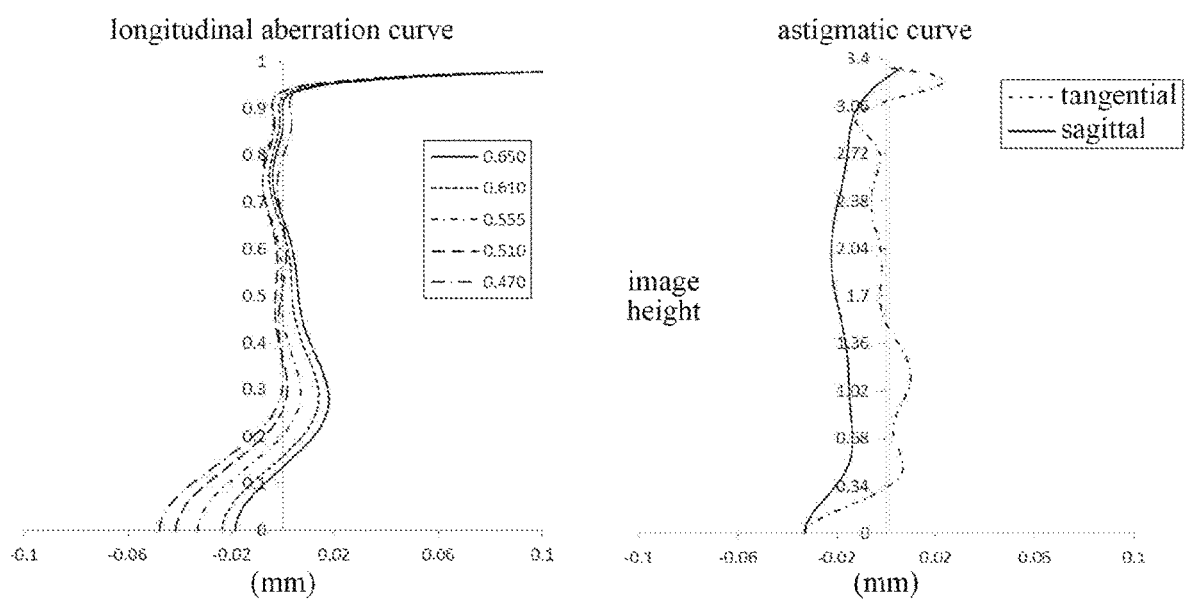
Fig. 22A                    Fig. 22B

CAMERA LENS GROUP

CROSS-REFERENCE TO RELATED APPLICATIONS

This disclosure is a continuation of International Application PCT/CN2018/085638, with an international filing date of May 4, 2018, which claims priority to Chinese Patent Application No. 201710860093.9, filed with the China National Intellectual Property Administration (CNIPA) on Sep. 21, 2017, and Chinese Patent Application No. 201721215393.3, filed with the China National Intellectual Property Administration (CNIPA) on Sep. 21, 2017, the contents of which are incorporated herein by reference in their entirety.

TECHNICAL FIELD

The present disclosure relates to a camera lens group, and more specifically to a camera lens group including seven lenses.

BACKGROUND

With the miniaturization trend of portable electronic products, requirements on ultra-thin and miniaturization of the counterpart camera lens groups have been brought forward. At the same time, with the popularization of portable electronic products such as mobile phones and tablet computers, the counterpart camera lens groups not only need to have good imaging quality in situations such as in daylight or sufficient lighting, but also need to have good imaging quality in situations such as insufficient lighting (e.g., on cloudy days, or at dusk). In this case, it puts corresponding requirements on aspects such as high-pixel, high resolution, brightness of the image plane, and aperture of the camera lens groups.

SUMMARY

The present disclosure provides a camera lens group such as a camera lens group having a large aperture, which may be applicable to portable electronic products and may at least or partially solve at least one of the above disadvantages in the existing technology.

According to an aspect, the present disclosure provides a camera lens group. The camera lens group includes, sequentially along an optical axis from an object side to an image side: a first lens, a second lens, a third lens, a fourth lens, a fifth lens, a sixth lens, and a seventh lens having refractive powers. The second lens may have a positive refractive power, and an object-side surface of the second lens may be a convex surface. An object-side surface of the third lens may be a convex surface, and an image-side surface of the third lens may be a concave surface. An object-side surface of the sixth lens may be a convex surface, and an image-side surface of the sixth lens may be a concave surface. An image-side surface of the seventh lens may be a concave surface. A center thickness CT4 of the fourth lens on the optical axis and a center thickness CT5 of the fifth lens on the optical axis may satisfy: CT4/CT5>1.5.

In an implementation, a total effective focal length f of the camera lens group and an entrance pupil diameter EPD of the camera lens group may satisfy: f/EPD≤1.65.

In an implementation, an effective focal length f2 of the second lens and the total effective focal length f of the camera lens group may satisfy: 0.5<f2/f<1.5.

In an implementation, an effective focal length f4 of the fourth lens and an effective focal length f6 of the sixth lens may satisfy: 0.5<f4/f6<2.

In an implementation, the seventh lens may have a negative refractive power, and an effective focal length f7 of the seventh lens and an effective focal length f2 of the second lens may satisfy: −1.5<f7/f2<−0.5.

In an implementation, a radius of curvature R6 of the image-side surface of the third lens and a radius of curvature R4 of an image-side surface of the second lens may satisfy: −0.5<R6/R4<0.8.

In an implementation, a radius of curvature R7 of an object-side surface of the fourth lens and a radius of curvature R8 of an image-side surface of the fourth lens may satisfy: 0<(R7+R8)/(R7−R8)≤1.5.

In an implementation, a total effective focal length f of the camera lens group and a radius of curvature R9 of an object-side surface of the fifth lens may satisfy: −3.5<f/R9<0.5.

In an implementation, an effective focal length f5 of the fifth lens and a radius of curvature R10 of an image-side surface of the fifth lens may satisfy: −2<f5/R10<22.

In an implementation, a radius of curvature R11 of the object-side surface of the sixth lens and a radius of curvature R12 of the image-side surface of the sixth lens may satisfy: 1.5<|R11+R12|/|R11−R12|<3.5.

In an implementation, a radius of curvature R12 of the image-side surface of the sixth lens and a radius of curvature R11 of the object-side surface of the sixth lens may satisfy: 1.5<R12/R11<4.0.

In an implementation, a spacing distance T67 between the sixth lens and the seventh lens on the optical axis and a spacing distance T56 between the fifth lens and the sixth lens on the optical axis may satisfy: 4<T67/T56<14.

In an implementation, a sum of center thickness ΣCT of each of the first lens to the seventh lens on the optical axis and an axial distance TTL from an object-side surface of the first lens to an image plane of the camera lens group may satisfy: 0.5≤ΣCT/TTL≤0.7.

In an implementation, an axial distance TTL from an object-side surface of the first lens to an image plane of the camera lens group and half of a diagonal length ImgH of an effective pixel area on the image plane of the camera lens group may satisfy: TTL/ImgH≤1.60.

According to another aspect, the present disclosure further provides a camera lens group. The camera lens group includes, sequentially along an optical axis from an object side to an image side: a first lens, a second lens, a third lens, a fourth lens, a fifth lens, a sixth lens, and a seventh lens having refractive powers. An object-side surface of the second lens may be a convex surface. An object-side surface of the third lens may be a convex surface, and an image-side surface of the third lens may be a concave surface. An object-side surface of the sixth lens may be a convex surface, and an image-side surface of the sixth lens may be a concave surface. An image-side surface of the seventh lens may be a concave surface. An effective focal length f4 of the fourth lens and an effective focal length f6 of the sixth lens may satisfy: 0.5<f4/f6<2.

In an implementation, the second lens may have a positive refractive power.

In an implementation, the fourth lens and the sixth lens may both have positive refractive powers.

According to another aspect, the present disclosure further provides a camera lens group. The camera lens group includes, sequentially along an optical axis from an object side to an image side: a first lens, a second lens, a third lens, a fourth lens, a fifth lens, a sixth lens, and a seventh lens having refractive powers. The second lens may have a positive refractive power, and an object-side surface of the second lens may be a convex surface. An object-side surface of the third lens may be a convex surface, and an image-side surface of the third lens may be a concave surface. An object-side surface of the sixth lens may be a convex surface, and an image-side surface of the sixth lens may be a concave surface. An image-side surface of the seventh lens may be a concave surface. An effective focal length f2 of the second lens and a total effective focal length f of the camera lens group may satisfy: 0.5<f2/f<1.5.

According to another aspect, the present disclosure further provides a camera lens group. The camera lens group includes, sequentially along an optical axis from an object side to an image side: a first lens, a second lens, a third lens, a fourth lens, a fifth lens, a sixth lens, and a seventh lens having refractive powers. The second lens may have a positive refractive power, and an object-side surface of the second lens may be a convex surface. An object-side surface of the third lens may be a convex surface, and an image-side surface of the third lens may be a concave surface. An object-side surface of the sixth lens may be a convex surface, and an image-side surface of the sixth lens may be a concave surface. An image-side surface of the seventh lens may be a concave surface. A spacing distance T67 between the sixth lens and the seventh lens on the optical axis and a spacing distance T56 between the fifth lens and the sixth lens on the optical axis may satisfy: 4<T67/T56<14.

According to another aspect, the present disclosure further provides a camera lens group. The camera lens group includes, sequentially along an optical axis from an object side to an image side: a first lens, a second lens, a third lens, a fourth lens, a fifth lens, a sixth lens, and a seventh lens having refractive powers. The second lens may have a positive refractive power, and an object-side surface of the second lens may be a convex surface. An object-side surface of the third lens may be a convex surface, and an image-side surface of the third lens may be a concave surface. An object-side surface of the sixth lens may be a convex surface, and an image-side surface of the sixth lens may be a concave surface. The seventh lens may have a negative refractive power, and an image-side surface of the seventh lens may be a concave surface. An effective focal length f7 of the seventh lens and an effective focal length f2 of the second lens may satisfy: −1.5<f7/f2<−0.5.

According to another aspect, the present disclosure further provides a camera lens group. The camera lens group includes, sequentially along an optical axis from an object side to an image side: a first lens, a second lens, a third lens, a fourth lens, a fifth lens, a sixth lens, and a seventh lens having refractive powers.

The second lens may have a positive refractive power, and an object-side surface of the second lens may be a convex surface. An object-side surface of the third lens may be a convex surface, and an image-side surface of the third lens may be a concave surface. An object-side surface of the sixth lens may be a convex surface, and an image-side surface of the sixth lens may be a concave surface. An image-side surface of the seventh lens may be a concave surface. A radius of curvature R12 of the image-side surface of the sixth lens and a radius of curvature R11 of the object-side surface of the sixth lens may satisfy: 1.5<R12/R11<4.0.

According to another aspect, the present disclosure further provides a camera lens group. The camera lens group includes, sequentially along an optical axis from an object side to an image side: a first lens, a second lens, a third lens, a fourth lens, a fifth lens, a sixth lens, and a seventh lens having refractive powers. The second lens may have a positive refractive power, and an object-side surface of the second lens may be a convex surface. An object-side surface of the third lens may be a convex surface, and an image-side surface of the third lens may be a concave surface. An object-side surface of the sixth lens may be a convex surface, and an image-side surface of the sixth lens may be a concave surface. An image-side surface of the seventh lens may be a concave surface. An axial distance TTL from an object-side surface of the first lens to an image plane of the camera lens group and half of a diagonal length ImgH of an effective pixel area on the image plane of the camera lens group may satisfy: TTL/ImgH≤1.60.

In the present disclosure, multiple lenses (e.g., seven lenses) are used. By reasonably configuring the refractive powers and the surface types of the lenses, the center thicknesses of the lenses and the spacing distances between the lenses, etc., the camera lens group has an advantage of large-aperture, the relative brightness on the image plane is enhanced, and the imaging effect in situations such as insufficient lighting improves. Meanwhile, the camera lens group with the above configuration may further have at least one of the beneficial effects: ultra-thin, miniaturization, large-aperture, low susceptibility, good processability, high imaging quality, or wide-angle.

BRIEF DESCRIPTION OF THE DRAWINGS

After reading detailed descriptions of non-limiting implementations with reference to the accompanying drawings, other features, objectives and advantages of the present disclosure will become more apparent. In the accompanying drawings:

FIGS. 2A-2D respectively illustrate a longitudinal aberration curve, an astigmatic curve, a distortion curve, and a lateral color curve of the camera lens group according to the first embodiment;

FIG. 3 is a schematic structural diagram illustrating a camera lens group according to the second embodiment of the present disclosure;

FIG. 5 is a schematic structural diagram illustrating a camera lens group according to the third embodiment of the present disclosure;

FIGS. 6A-6D respectively illustrate a longitudinal aberration curve, an astigmatic curve, a distortion curve, and a lateral color curve of the camera lens group according to the third embodiment;

FIGS. 10A-10D respectively illustrate a longitudinal aberration curve, an astigmatic curve, a distortion curve, and a lateral color curve of the camera lens group according to the fifth embodiment;

FIG. 11 is a schematic structural diagram illustrating a camera lens group according to the sixth embodiment of the present disclosure;

FIGS. 18A-18D respectively illustrate a longitudinal aberration curve, an astigmatic curve, a distortion curve, and a lateral color curve of the camera lens group according to the ninth embodiment;

FIG. 19 is a schematic structural diagram illustrating a camera lens group according to the tenth embodiment of the present disclosure;

FIG. 21 is a schematic structural diagram illustrating a camera lens group according to the eleventh embodiment of the present disclosure;

FIGS. 22A-22D respectively illustrate a longitudinal aberration curve, an astigmatic curve, a distortion curve, and a lateral color curve of the camera lens group according to the eleventh embodiment.

DETAILED DESCRIPTION OF EMBODIMENTS

Figure 1:
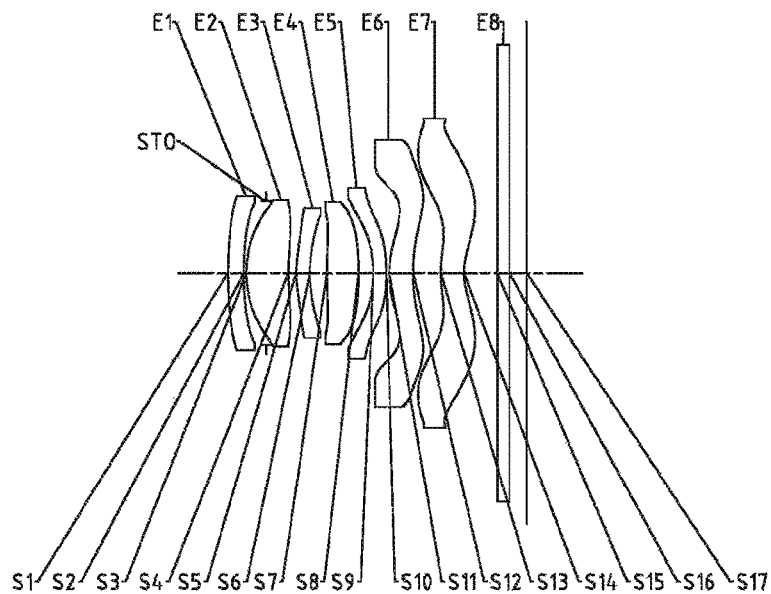
FIG. 1 is a schematic structural diagram illustrating a camera lens group according to the first embodiment of the present disclosure.

For a better understanding of the present disclosure, various aspects of the present disclosure will be described in more detail with reference to the accompanying drawings. It should be understood that the detailed description is merely an illustration for the illustrative implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second," and "third" are only used to distinguish one feature from another, rather than represent any limitations to the feature. Thus, the first lens discussed below may also be referred to as the second lens or the third lens without departing from the teachings of the present disclosure.

In the accompanying drawings, the thicknesses, sizes, and shapes of the lenses have been slightly exaggerated for the convenience of explanation. Specifically, shapes of spherical surfaces or aspheric surfaces shown in the accompanying drawings are shown by examples. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area. If a surface of a lens is a concave surface and a position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements, or components, but do not exclude the presence or addition of one or more other features, elements, components, or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "illustrative" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

A camera lens group according to illustrative implementations of the present disclosure includes, for example, seven lenses (i.e., a first lens, a second lens, a third lens, a fourth lens, a fifth lens, a sixth lens, and a seventh lens) having refractive powers. The seven lenses are sequentially arranged from the object side to the image side along the optical axis.

In the illustrative implementations, the camera lens group may include: the first lens having a refractive power; the second lens having a positive refractive power, and an object-side surface of the second lens is a convex surface; a third lens having a refractive power, an object-side surface of the third lens is a convex surface, and an image-side surface of the third lens is a concave surface; the fourth lens having a refractive power; the fifth lens having a refractive power; the sixth lens having a refractive power, an object-side surface of the sixth lens is a convex surface, and an image-side surface of the sixth lens is a concave surface; and the seventh lens having a refractive power, and an image-side surface of the seventh lens is a concave surface.

In an implementation, the first lens may have a negative refractive power; the second lens may have a positive refractive power; the third lens may have a positive refractive power; the fourth lens may have a positive refractive power; the fifth lens may have a negative refractive power; the sixth lens may have a positive refractive power; and the seventh lens may have a negative refractive power.

In an implementation, the first lens may have a negative refractive power; the second lens may have a positive refractive power; the third lens may have a negative refractive power; the fourth lens may have a positive refractive power; the fifth lens may have a negative refractive power; the sixth lens may have a positive refractive power; and the seventh lens may have a negative refractive power.

In an implementation, the first lens may have a positive refractive power; the second lens may have a positive refractive power; the third lens may have a negative refractive power; the fourth lens may have a positive refractive power; the fifth lens may have a negative refractive power; the sixth lens may have a positive refractive power; and the seventh lens may have a negative refractive power.

The second lens may have a positive refractive power, an effective focal length f2 of the second lens and a total effective focal length f of the camera lens group may satisfy: $0.5<f2/f<1.5$, and more specifically, f2 and f may further satisfy: $0.80 \leq f2/f \leq 1.40$. By controlling the positive refractive power of the second lens within a reasonable range, it is possible to effectively control aberrations related to the field-of-view such as the curvature of field and distortion, thereby improving the imaging quality.

An effective focal length f4 of the fourth lens and an effective focal length f6 of the sixth lens may satisfy: $0.5<f4/f6<2.0$, and more specifically, f4 and f6 may further satisfy: $0.92 \leq f4/f6 \leq 1.89$. By properly configuring the refractive powers of the fourth lens and the sixth lens, aberrations of the imaging system may be effectively reduced, and the susceptibility of the imaging system may be reduced. In an illustrative embodiment, both the second lens and the fourth lens may have positive refractive powers.

An effective focal length f7 of the seventh lens and an effective focal length f2 of the second lens may satisfy: $-1.5<f7/f2<-0.5$, and more specifically, f7 and f2 may further satisfy: $-1.21 \leq f7/f2 \leq -0.79$. Properly configuring the refractive powers of the seventh lens and the second lens is beneficial to improving the optical performance of the lens assembly and obtaining a good imaging quality. In an illustrative embodiment, the second lens may have a positive refractive power and the seventh lens may have a negative refractive power.

In practice applications, the radius of curvature of each lens surface in the lens group may be optimized, and the lens group has a good optical performance by properly controlling the bending direction and bending degree of each surface.

The total effective focal length f of the camera lens group and a radius of curvature R9 of an object-side surface of the fifth lens may satisfy: $-3.5<f/R9<0.5$, and more specifically, f and R9 may further satisfy: $-3.11 \leq f/R9 \leq 0.01$. By properly arranging the radius of curvature of the object-side surface of the fifth lens, the deflection angle of light may be controlled within a reasonable range, thereby making the imaging system easier to match with common chips.

An effective focal length f5 of the fifth lens and a radius of curvature R10 of an image-side surface of the fifth lens may satisfy: $-2<f5/R10<22$, and more specifically, f5 and R10 may further satisfy: $-1.54 \leq f5/R10 \leq 21.08$. By properly arranging the radius of curvature of the image-side surface of the fifth lens, it is possible to undertake a reasonable deflection angle of light, thereby reducing primary aberrations of the imaging system. In an illustrative embodiment, the fifth lens may have a negative refractive power.

A radius of curvature R6 of the image-side surface of the third lens and a radius of curvature R4 of an image-side surface of the second lens may satisfy: $-0.5<R6/R4<0.8$, and more specifically, R6 and R4 may further satisfy: $-0.11 \leq R6/R4 \leq 0.59$. By properly controlling the bending directions and bending degree of the image-side surface of the second lens and the image-side surface of the third lens, the curvature of field of the imaging system may be effectively controlled, thereby improving the imaging quality of the imaging system. Optionally, the image-side surface of the third lens may be a concave surface.

A radius of curvature R7 of an object-side surface of the fourth lens and a radius of curvature R8 of an image-side surface of the fourth lens may satisfy: $0<(R7+R8)/(R7-R8) \leq 1.5$, and more specifically, R7 and R8 may further satisfy: $0.28 \leq (R7+R8)/(R7-R8) \leq 1.50$. By properly controlling the radii of curvature of the object-side surface and the image-side surface of the fourth lens, the amount of astigmatism of the imaging system may be effectively controlled. Optionally, the fourth lens may be a lenticular lens or the fourth lens may be a meniscus lens that is convex to the image side.

A radius of curvature R11 of the object-side surface of the sixth lens and a radius of curvature R12 of the image-side surface of the sixth lens may satisfy: $1.5<|R11+R12|/|R11-R12|<3.5$, and more specifically, R11 and R12 may further satisfy: $1.79 \leq |R11+R12|/|R11-R12| \leq 3.16$. Alternatively, the radius of curvature R11 of the object-side surface of the sixth lens and the radius of curvature R12 of the image-side surface of the sixth lens may further satisfy: $1.5<R12/R11<4.0$, and more specifically, R11 and R12 may further satisfy: $1.93 \leq R12/R11 \leq 3.53$. By controlling the bending directions and bending degree of the object-side surface and the image-side surface of the sixth lens, the amount of curvature of field of the imaging system is controlled, thereby realizing the correction of the overall aberration of the imaging system. Optionally, the object-side surface of the sixth lens may be a convex surface, and the image-side surface of the sixth lens may be a concave surface.

In practice applications, the center thickness of each lens and the spacing distances between the lenses may also be optimized so that the lens group has a good optical performance.

A center thickness CT4 of the fourth lens on the optical axis and a center thickness CT5 of the fifth lens on the optical axis may satisfy: $CT4/CT5>1.5$, and more specifically, CT4 and CT5 may further satisfy: $1.64 \leq CT4/CT5 \leq 2.52$. By properly arranging the center thickness CT4 of the fourth lens and the center thickness CT5 of the fifth lens, the imaging system may have a good ability to eliminate distortion while ensuring miniaturization, thereby improving the imaging quality of the imaging system.

A sum of center thickness ΣCT of each of the lenses having refractive powers on the optical axis and an axial distance TTL from the center of an object-side surface of the first lens to an image plane of the camera lens group may satisfy: $0.5 \leq \Sigma CT/TTL \leq 0.7$, and more specifically, ΣCT and TTL may further satisfy: $0.55 \leq \Sigma CT/TTL \leq 0.60$. By properly arranging the center thickness of each lens, it is advantageous to the imaging system in obtaining a better imaging quality. In addition, the proper distribution of the center thickness of each lens also contributes to the stability of the lens group assembly. In a camera lens group including seven lenses having refractive powers, $\Sigma CT = CT1+CT2+CT3+CT4+CT5+CT6+CT7$. Here, CT1 is the center thickness of the first lens on the optical axis, CT2 is the center thickness of the second lens on the optical axis, CT3 is the center thickness of the third lens on the optical axis, CT4 is the center thickness of the fourth lens on the optical axis, CT5 is the center thickness of the fifth lens on the optical axis, CT6 is the center thickness of the sixth lens on the optical axis, and CT7 is the center thickness of the seventh lens on the optical axis.

A spacing distance T67 between the sixth lens and the seventh lens on the optical axis and a spacing distance T56 between the fifth lens and the sixth lens on the optical axis may satisfy: $4 < T67/T56 < 14$, and more specifically, T67 and T56 may further satisfy: $4.36 \leq T67/T56 \leq 13.77$. Properly configuring the spacing distances between the lenses may effectively compress the longitudinal dimension of the imaging system and realize the ultra-thin characteristic of the imaging system.

The axial distance TTL from the center of the object-side surface of the first lens to the image plane of the camera lens group and half of a diagonal length ImgH of an effective pixel area on the image plane of the camera lens group may satisfy: $TTL/ImgH \leq 1.60$, and more specifically, TTL and ImgH may further satisfy: $1.40 \leq TTL/ImgH \leq 1.55$. By controlling the ratio of the total track length to the image height of the lens assembly, the size of the imaging system may be effectively compressed to achieve the ultra-thin characteristic and miniaturization of the camera lens group, so that the camera lens group may be suitably applied to a system of a limited size such as a portable electronic product.

The total effective focal length f of the camera lens group and an entrance pupil diameter EPD of the camera lens group may satisfy: $f/EPD \leq 1.65$, and more specifically, f and EPD may further satisfy: $1.54 \leq f/EPD \leq 1.65$. The smaller the aperture number Fno of the camera lens group is (that is, the total effective focal length f of the lens group/the entrance pupil diameter EPD of the lens group), the larger the aperture of the lens group is, and the larger the amount of light entered in an identical unit time is. The reduction of the aperture number Fno may effectively enhance the brightness of the image plane, so that the lens group may better satisfy the shooting requirements when the lighting is insufficient, such as in cloudy days or at dusk. The lens group is configured to satisfy the conditional expression $f/EPD \leq 1.65$, which may make the lens group have an advantage of large aperture in the process of increasing the amount of light admitted, and enhance the relative illumination of the image plane, thereby reducing aberrations of the edge field while improving the imaging effect of the lens group in a dark environment.

In the illustrative implementations, the camera lens group may be further provided with at least one diaphragm to improve the imaging quality of the lens assembly. The diaphragm may be disposed between the first lens and the second lens.

Optionally, the camera lens group may further include at least one of an optical filter for correcting color deviations or a protective glass for protecting the photosensitive element on the image plane.

The camera lens group according to the above implementations of the present disclosure may use multiple lenses, for example, seven lenses as described in the preceding text. By reasonably configuring the refractive power, surface type of each lens, the center thickness of each lens and the spacing distances between the lenses, etc., the volume of the lens group may be effectively reduced, the susceptibility of the lens group may be reduced, and the processability of the lens group may be improved, which makes the camera lens group more conducive to production and processing and may be applied to portable electronic products. At the same time, the camera lens group with the above configuration also has beneficial effects such as ultra-thin, large aperture, high brightness, or high imaging quality.

In the implementations of the present disclosure, at least one of the surfaces of the each lens is an aspheric surface. The characteristic of the aspheric lens is: from the center of the lens to the periphery, the curvature continuously changes. Unlike the spherical lens with a constant curvature from the center of the lens to the periphery, the aspheric lens has a better radius-of-curvature characteristic, having advantages of improving the distortion aberration and improving the astigmatic aberration. The use of the aspheric lens may eliminate as much as possible the aberrations that occur during the imaging, thereby improving the imaging quality.

However, it should be understood by those skilled in the art that the various results and advantages described in the present specification may be obtained by changing the number of the lenses constituting the camera lens group without departing from the technical solution claimed by the present disclosure. For example, although the camera lens group having seven lenses is described as an example in the implementations, the camera lens group is not limited to include seven lenses. If required, the camera lens group may also include other numbers of lenses.

Specific embodiments of the camera lens group that may be applied to the above implementations are further described below with reference to the accompanying drawings.

First Embodiment

A camera lens group according to the first embodiment of the present disclosure is described below with reference to FIGS. 1-2D. FIG. 1 is a schematic structural diagram illustrating the camera lens group according to the first embodiment of the present disclosure.

As shown in FIG. 1, the camera lens group along an optical axis from an object side to an image side sequentially includes a first lens E1, a second lens E2, a third lens E3, a fourth lens E4, a fifth lens E5, a sixth lens E6, a seventh lens E7, and an image plane S17.

The first lens E1 has a negative refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a positive refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a convex surface, an image-side surface S14 of the seventh lens E7 is a concave surface, and the object-side surface S13 and the image-side surface S14 of the seventh lens E7 are both aspheric surfaces.

Optionally, the camera lens group may further include an optical filter E8 having an object-side surface S15 and an image-side surface S16. Light from an object passes through the surfaces S1 to S16 sequentially and is finally imaged on the image plane S17.

Optionally, the camera lens group may further include a diaphragm STO disposed between the first lens E1 and the second lens E2, to improve the imaging quality.

Table 1 shows the surface type, the radius of curvature, the thickness, the material, and the conic coefficient of each lens of the camera lens group in the first embodiment. The radius of curvature and the thickness are shown in millimeters (mm).

TABLE 1

| surface number | surface type | radius of curvature | thickness | refractive index | abbe number | conic coefficient |
|---|---|---|---|---|---|---|
| OBJ | spherical | infinite | infinite | | | |
| S1 | aspheric | 8.0734 | 0.2700 | 1.65 | 23.5 | 24.9212 |
| S2 | aspheric | 6.4440 | 0.3800 | | | 20.6977 |
| STO | spherical | infinite | −0.3383 | | | 0.0000 |
| S3 | aspheric | 1.8658 | 0.7173 | 1.55 | 56.1 | −1.1516 |
| S4 | aspheric | 4.3394 | 0.1346 | | | −23.4906 |
| S5 | aspheric | 2.2959 | 0.2300 | 1.67 | 20.4 | −22.3092 |
| S6 | aspheric | 2.2580 | 0.2924 | | | −8.5335 |
| S7 | aspheric | 11.5495 | 0.5355 | 1.55 | 56.1 | 99.0000 |
| S8 | aspheric | −6.2882 | 0.2579 | | | −0.0695 |
| S9 | aspheric | −1.8535 | 0.2300 | 1.67 | 20.4 | −5.0753 |
| S10 | aspheric | −4.1487 | 0.0506 | | | −2.3348 |

TABLE 1-continued

| surface number | surface type | radius of curvature | thickness | refractive index | abbe number | conic coefficient |
|---|---|---|---|---|---|---|
| S11 | aspheric | 1.6112 | 0.4074 | 1.55 | 56.1 | −3.5841 |
| S12 | aspheric | 4.5159 | 0.4704 | | | −25.4896 |
| S13 | aspheric | 1.9606 | 0.3931 | 1.55 | 56.1 | −1.7036 |
| S14 | aspheric | 1.1125 | 0.5659 | | | −4.1912 |
| S15 | spherical | infinite | 0.2100 | 1.52 | 64.2 | |
| S16 | spherical | infinite | 0.2930 | | | |
| S17 | spherical | infinite | | | | |

As may be known from Table 1, the radius of curvature R6 of the image-side surface S6 of the third lens E3 and the radius of curvature R4 of the image-side surface S4 of the second lens E2 satisfy: R6/R4=0.52. The radius of curvature R7 of the object-side surface S7 of the fourth lens E4 and the radius of curvature R8 of the image-side surface S8 of the fourth lens E4 satisfy: (R7+R8)/(R7−R8)=0.29. The radius of curvature R11 of the object-side surface S11 of the sixth lens E6 and the radius of curvature R12 of the image-side surface S12 of the sixth lens E6 satisfy: |R11+R12|/|R11−R12|=2.11. The radius of curvature R11 of the object-side surface S11 of the sixth lens E6 and the radius of curvature R12 of the image-side surface S12 of the sixth lens E6 also satisfy: R12/R11=2.80. The center thickness CT4 of the fourth lens E4 on the optical axis and the center thickness CT5 of the fifth lens E5 on the optical axis satisfy: CT4/CT5=2.33. The sum of the center thickness ΣCT of each of the first lens E1 to the seventh lens E7 on the optical axis and the axial distance TTL from the center of the object-side surface S1 of the first lens E1 to the image plane S17 of the camera lens group satisfy: ΣCT/TTL=0.55. The spacing distance T67 between the sixth lens E6 and the seventh lens E7 on the optical axis and the spacing distance T56 between the fifth lens E5 and the sixth lens E6 on the optical axis satisfy: T67/T56=9.29.

In the present embodiment, the aspheric lens may be used for each lens, and the surface type x of each aspheric surface is defined by the following formula:

$$x = \frac{ch^2}{1+\sqrt{1-(k+1)c^2h^2}} + \sum A_i h^i \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1 above); and $A_i$ is the correction coefficient of the $i^{th}$ order of the aspheric surface. Table 2 below shows the high-order coefficients $A_4$, $A_6$, $A_8$, $A_{10}$, $A_{12}$, $A_{14}$, $A_{16}$, $A_{18}$, and $A_{20}$ applicable to the aspheric surfaces S1-S14 in the first embodiment.

TABLE 2

| surface number | A4 | A6 | A8 | A10 | A12 |
|---|---|---|---|---|---|
| S1 | −5.0290E−03 | 5.9550E−03 | 7.9063E−04 | −5.8049E−04 | −2.3802E−04 |
| S2 | 8.6957E−03 | 5.3331E−03 | 2.4330E−03 | 6.3520E−04 | −5.6508E−04 |
| S3 | 2.8603E−02 | 1.1115E−02 | −3.6281E−02 | 6.2237E−02 | −6.0402E−02 |
| S4 | −8.9653E−02 | 3.2370E−02 | 3.2978E−03 | −3.4618E−02 | 3.4016E−02 |
| S5 | 4.3724E−02 | −3.0849E−01 | 5.1312E−01 | −4.0415E−01 | 1.3003E−01 |
| S6 | −9.9407E−03 | 1.2779E−02 | −1.8567E−01 | 6.6119E−01 | −8.9464E−01 |
| S7 | −3.7865E−02 | −3.7996E−03 | −8.6546E−02 | 1.5672E−01 | −1.3465E−01 |
| S8 | −5.3681E−02 | 4.0791E−02 | −1.9376E−01 | 2.7248E−01 | −2.3520E−01 |
| S9 | −7.9208E−02 | 6.1842E−02 | −2.2000E−01 | 2.5309E−01 | −8.6698E−02 |
| S10 | −2.7309E−01 | 3.2286E−01 | −3.3077E−01 | 2.0540E−01 | −2.1940E−02 |
| S11 | −1.2097E−01 | 1.6909E−01 | −2.7741E−01 | 2.2421E−01 | −1.0218E−01 |
| S12 | 2.0056E−01 | −2.5418E−01 | 1.4541E−01 | −5.1422E−02 | 1.1013E−02 |
| S13 | −4.0329E−01 | 1.9830E−01 | −5.9115E−02 | 1.2934E−02 | −1.9697E−03 |
| S14 | −2.0193E−01 | 1.1060E−01 | −4.4376E−02 | 1.1496E−02 | −1.7605E−03 |

| surface number | A14 | A16 | A18 | A20 |
|---|---|---|---|---|
| S1 | 1.0317E−04 | −2.5728E−05 | −2.9503E−06 | 7.6610E−08 |
| S2 | −2.0480E−04 | 2.4589E−05 | 8.0134E−08 | −3.0700E−07 |
| S3 | 2.9558E−02 | −6.0519E−03 | 0.0000E+00 | 0.0000E+00 |
| S4 | −1.2754E−02 | 1.1508E−03 | 0.0000E+00 | 0.0000E+00 |
| S5 | 2.8199E−02 | −2.1736E−02 | 0.0000E+00 | 0.0000E+00 |
| S6 | 5.7050E−01 | −1.3605E−01 | 0.0000E+00 | 0.0000E+00 |
| S7 | 1.6809E−02 | 1.8713E−02 | 0.0000E+00 | 0.0000E+00 |
| S8 | 1.1547E−01 | −2.3346E−02 | 0.0000E+00 | 0.0000E+00 |
| S9 | 1.4334E−03 | 1.0057E−03 | 0.0000E+00 | 0.0000E+00 |
| S10 | −2.5817E−02 | 7.0228E−03 | 0.0000E+00 | 0.0000E+00 |
| S11 | 2.4319E−02 | −2.2896E−03 | 0.0000E+00 | 0.0000E+00 |
| S12 | −1.2680E−03 | 5.9135E−05 | 0.0000E+00 | 0.0000E+00 |
| S13 | 1.7696E−04 | −6.8372E−06 | 0.0000E+00 | 0.0000E+00 |
| S14 | 1.4376E−04 | −4.7589E−06 | 0.0000E+00 | 0.0000E+00 |

Table 3 shows the effective focal lengths f1-f7 of the lenses, the total effective focal length f of the camera lens group, the total track length TTL (i.e., the axial distance from the center of the object-side surface S1 of the first lens E1 to the image plane S17), and the half of the diagonal length ImgH of the effective pixel area on the image plane S17 in the first embodiment.

TABLE 3

| parameter | | | | |
|---|---|---|---|---|
| f1 (mm) | f2 (mm) | f3 (mm) | f4 (mm) | f5 (mm) |
| value | | | | |
| −53.06 | 5.44 | 144.17 | 7.54 | −5.24 |
| parameter | | | | |
| f6 (mm) | f7 (mm) | f (mm) | TTL (mm) | ImgH (mm) |
| value | | | | |
| 4.37 | −5.63 | 3.89 | 5.10 | 3.41 |

As may be known from Table 1 and Table 3, the effective focal length f2 of the second lens E2 and the total effective focal length f of the camera lens group satisfy: f2/f=1.40. The effective focal length f4 of the fourth lens E4 and the effective focal length f6 of the sixth lens E6 satisfy: f4/f6=1.72. The effective focal length f7 of the seventh lens E7 and the effective focal length f2 of the second lens E2 satisfy: f7/f2=−1.04. The axial distance TTL from the object-side surface S1 of the first lens E1 to the image plane S17 and the half of the diagonal length ImgH of the effective pixel area on the image plane S17 satisfy: TTL/ImgH=1.50. The total effective focal length f of the camera lens group and the radius of curvature R9 of the object-side surface S9 of the fifth lens E5 satisfy: f/R9=−2.10. The effective focal length f5 of the fifth lens E5 and the radius of curvature R10 of the image-side surface S10 of the fifth lens E5 satisfy: f5/R10=1.26.

In the present embodiment, the total effective focal length f of the camera lens group and the entrance pupil diameter EPD of the camera lens group satisfy: f/EPD=1.59, and the camera lens group has a large aperture.

Figures 2A, 2B:
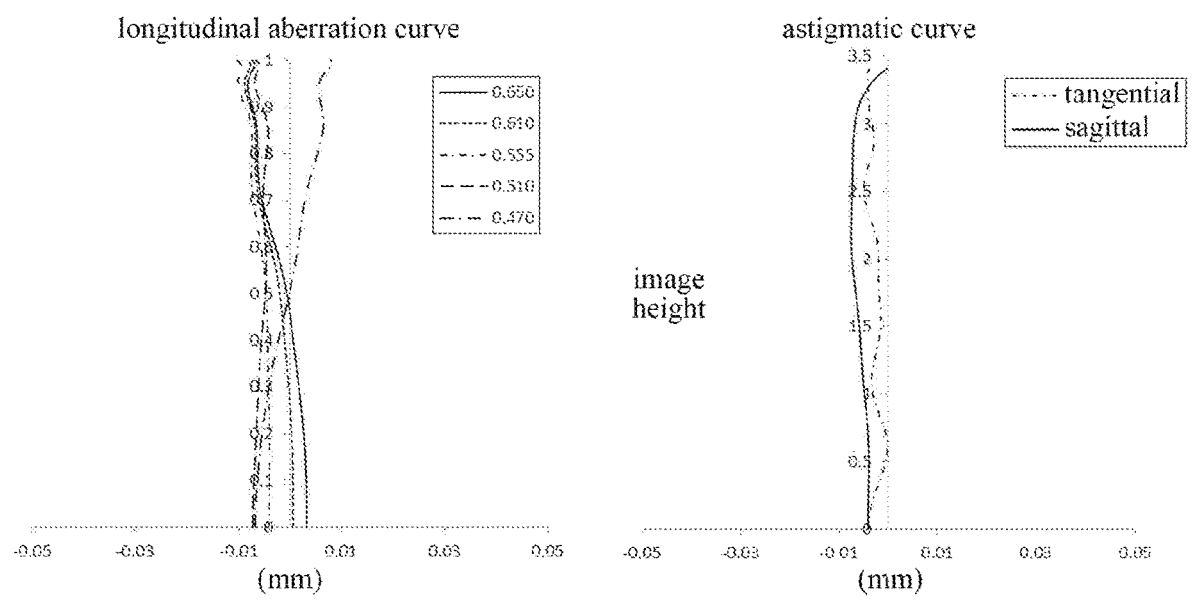

FIG. 2A shows the longitudinal aberration curve of the camera lens group according to the first embodiment, representing deviations of focal points of light of different wavelengths converged after passing through the lens group. FIG. 2B shows the astigmatic curve of the camera lens group according to the first embodiment, representing a curvature of the tangential image plane and a curvature of the sagittal image plane. FIG. 2C shows the distortion curve of the camera lens group according to the first embodiment, representing amounts of distortion at different viewing angles. FIG. 2D shows the lateral color curve of the camera lens group according to the first embodiment, representing deviations of different image heights on the image plane after light passes through the lens group. It can be seen from FIG. 2A to FIG. 2D that the camera lens group given in the first embodiment may achieve a good imaging quality.

Second Embodiment

A camera lens group according to the second embodiment of the present disclosure is described below with reference to FIGS. 3-4D. In the present embodiment and the following embodiments, for the purpose of brevity, the description of parts similar to those in the first embodiment will be omitted. FIG. 3 is a schematic structural diagram illustrating the camera lens group according to the second embodiment of the present disclosure.

As shown in FIG. 3, the camera lens group along an optical axis from an object side to an image side sequentially includes a first lens E1, a second lens E2, a third lens E3, a fourth lens E4, a fifth lens E5, a sixth lens E6, a seventh lens E7, and an image plane S17.

The first lens E1 has a negative refractive power, an object-side surface S1 of the first lens E1 is a concave surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a convex surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a concave surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Optionally, the camera lens group may further include an optical filter E8 having an object-side surface S15 and an image-side surface S16. Light from an object passes through the surfaces S1 to S16 sequentially and is finally imaged on the image plane S17.

Optionally, the camera lens group may further include a diaphragm STO disposed between the first lens E1 and the second lens E2, to improve the imaging quality.

Table 2 shows the surface type, the radius of curvature, the thickness, the material, and the conic coefficient of each lens of the camera lens group in the second embodiment. The radius of curvature and the thickness are shown in millimeters (mm). Table 5 shows the high-order coefficients applicable to each aspheric surface in the second embodiment. The surface type of each aspheric surface may be defined by the formula (1) given in the above the first embodiment. Table 6 shows the effective focal lengths f1-f7 of the lenses, the total effective focal length f of the camera lens group, the total track length TTL, and the half of the diagonal length ImgH of the effective pixel area on the image plane S17 in the second embodiment.

TABLE 4

| surface number | surface type | radius of curvature | thickness | material refractive index | abbe number | conic coefficient |
|---|---|---|---|---|---|---|
| OBJ | spherical | infinite | infinite | | | |
| S1 | aspheric | −25.1200 | 0.2700 | 1.65 | 23.5 | 99.0000 |
| S2 | aspheric | 8.0785 | 0.3800 | | | −98.9598 |
| STO | spherical | infinite | −0.3383 | | | 0.0000 |
| S3 | aspheric | 1.8124 | 0.7663 | 1.55 | 56.1 | −0.5650 |
| S4 | aspheric | −21.4641 | 0.2346 | | | −95.4860 |
| S5 | aspheric | 2.4097 | 0.2500 | 1.67 | 20.4 | −15.7617 |
| S6 | aspheric | 2.2547 | 0.2907 | | | −12.5168 |
| S7 | aspheric | −73.4682 | 0.5823 | 1.55 | 56.1 | −99.0000 |
| S8 | aspheric | −3.3571 | 0.1166 | | | 4.5661 |
| S9 | aspheric | 242.2438 | 0.2500 | 1.67 | 20.4 | −99.0000 |
| S10 | aspheric | 5.6346 | 0.1244 | | | −99.0000 |
| S11 | aspheric | 2.0233 | 0.2594 | 1.55 | 56.1 | −5.5534 |
| S12 | aspheric | 4.5160 | 0.7213 | | | −1.4643 |
| S13 | aspheric | −2.9301 | 0.2500 | 1.55 | 56.1 | −16.1305 |
| S14 | aspheric | 2.8629 | 0.1295 | | | −20.5439 |
| S15 | spherical | infinite | 0.2100 | 1.52 | 64.2 | |
| S16 | spherical | infinite | 0.2930 | | | |
| S17 | spherical | infinite | | | | |

TABLE 5

| surface number | A4 | A6 | A8 | A10 | A12 |
|---|---|---|---|---|---|
| S1 | −3.1606E−02 | 1.2317E−02 | −9.5723E−04 | −9.7297E−04 | 5.4298E−05 |
| S2 | −1.5676E−03 | 6.7762E−03 | 9.6210E−04 | −1.4389E−03 | 5.0207E−04 |
| S3 | 6.4429E−03 | 1.3011E−02 | −1.4037E−02 | 9.8509E−03 | −3.4618E−03 |
| S4 | −6.1360E−02 | 6.9135E−02 | −6.8419E−02 | 5.6373E−02 | −3.1546E−02 |
| S5 | −1.5262E−02 | −1.0309E−01 | 1.3099E−01 | −7.1021E−02 | −1.6594E−02 |
| S6 | 2.4850E−02 | −1.3195E−01 | 1.7759E−01 | −1.4327E−01 | 8.3779E−02 |
| S7 | −1.8602E−02 | −7.3281E−02 | 1.4160E−01 | −2.9029E−01 | 3.4917E−01 |
| S8 | 8.7750E−03 | −4.1383E−01 | 8.0406E−01 | −8.6494E−01 | 5.4797E−01 |
| S9 | 1.3583E−02 | −5.4264E−01 | 8.7509E−01 | −7.3344E−01 | 3.2657E−01 |
| S10 | −3.1347E−02 | −3.3134E−01 | 5.9758E−01 | −5.5175E−01 | 2.9638E−01 |
| S11 | −3.3222E−03 | −1.4682E−01 | 1.2377E−01 | −9.3585E−02 | 4.3929E−02 |
| S12 | 1.2503E−01 | −1.8021E−01 | 8.8982E−02 | −2.3870E−02 | 3.7950E−03 |

TABLE 5-continued

| S13 | −2.4387E−01 | 1.4971E−01 | −3.3909E−02 | 1.4852E−03 | 7.2158E−04 |
| S14 | −9.8564E−02 | 5.6600E−02 | −2.0063E−02 | 4.1280E−03 | −4.7462E−04 |

| surface number | A14 | A16 | A18 | A20 |
| --- | --- | --- | --- | --- |
| S1 | 1.3862E−04 | −2.5728E−05 | −2.9505E−06 | 7.6588E−08 |
| S2 | −2.0479E−04 | 2.4589E−05 | 8.0425E−08 | −3.0690E−07 |
| S3 | 5.2107E−04 | 4.8784E−06 | 0.0000E+00 | 0.0000E+00 |
| S4 | 1.0578E−02 | −1.5771E−03 | 0.0000E+00 | 0.0000E+00 |
| S5 | 4.9271E−02 | −2.0620E−02 | 0.0000E+00 | 0.0000E+00 |
| S6 | −2.7224E−02 | 9.1581E−03 | 0.0000E+00 | 0.0000E+00 |
| S7 | −2.2947E−01 | 6.8765E−02 | 0.0000E+00 | 0.0000E+00 |
| S8 | −1.9075E−01 | 2.7556E−02 | 0.0000E+00 | 0.0000E+00 |
| S9 | −5.9240E−02 | −2.8212E−03 | 0.0000E+00 | 0.0000E+00 |
| S10 | −8.7563E−02 | 1.0801E−02 | 0.0000E+00 | 0.0000E+00 |
| S11 | −1.2012E−02 | 1.5227E−03 | 0.0000E+00 | 0.0000E+00 |
| S12 | −3.4298E−04 | 1.3467E−05 | 0.0000E+00 | 0.0000E+00 |
| S13 | −1.3018E−04 | 6.8634E−06 | 0.0000E+00 | 0.0000E+00 |
| S14 | 2.8319E−05 | −6.8050E−07 | 0.0000E+00 | 0.0000E+00 |

TABLE 6

| parameter | | | | |
| --- | --- | --- | --- | --- |
| f1 (mm) | f2 (mm) | f3 (mm) | f4 (mm) | f5 (mm) |
| value −9.47 | 3.10 | −148.02 | 6.42 | −8.67 |

| parameter | | | | |
| --- | --- | --- | --- | --- |
| f6 (mm) | f7 (mm) | f (mm) | TTL (mm) | ImgH (mm) |
| value 6.48 | −2.61 | 3.59 | 4.79 | 3.41 |

Figure 4A:
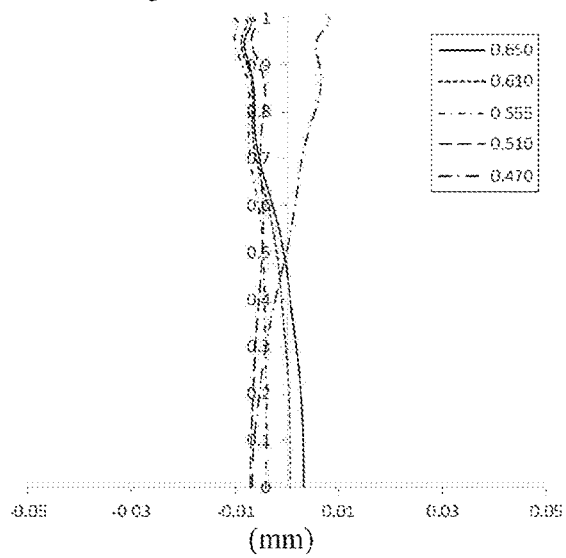
FIGS. 4A-4D respectively illustrate a longitudinal aberration curve, an astigmatic curve, a distortion curve, and a lateral color curve of the camera lens group according to the second embodiment.
Figure 4B:
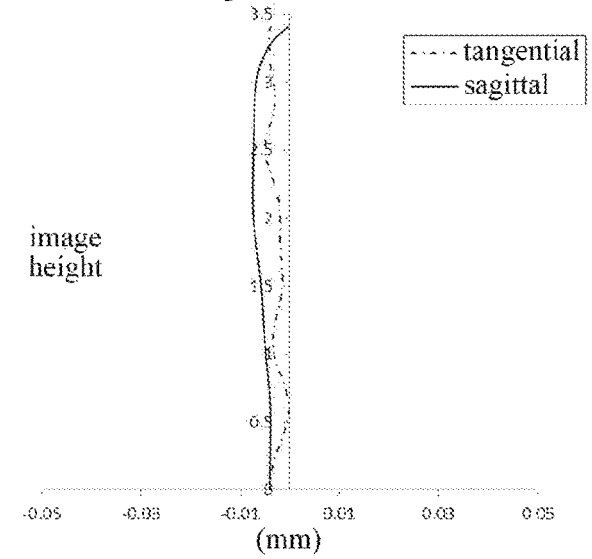
Figure 4C:
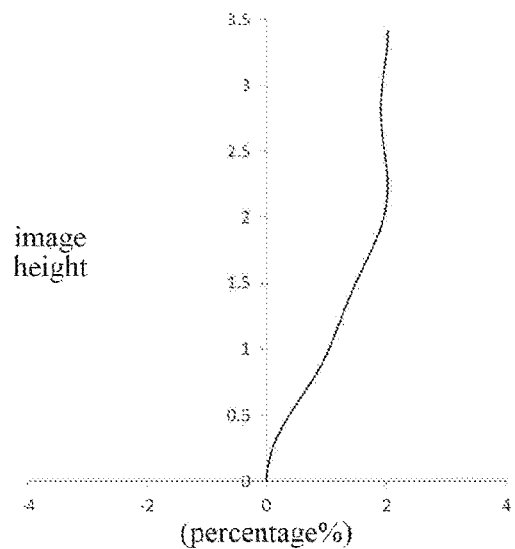
Figure 4D:
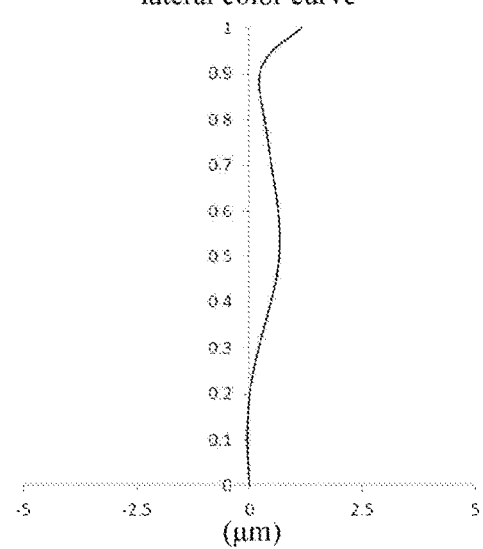

FIG. 4A shows the longitudinal aberration curve of the camera lens group according to the second embodiment, representing deviations of focal points of light of different wavelengths converged after passing through the lens group. FIG. 4B shows the astigmatic curve of the camera lens group according to the second embodiment, representing a curvature of the tangential image plane and a curvature of the sagittal image plane. FIG. 4C shows the distortion curve of the camera lens group according to the second embodiment, representing amounts of distortion at different viewing angles. FIG. 4D shows the lateral color curve of the camera lens group according to the second embodiment, representing deviations of different image heights on the image plane after light passes through the lens group. It can be seen from FIG. 4A to FIG. 4D that the camera lens group given in the second embodiment may achieve a good imaging quality.

Third Embodiment

A camera lens group according to the third embodiment of the present disclosure is described below with reference to FIGS. 5-6D. FIG. 5 is a schematic structural diagram illustrating the camera lens group according to the third embodiment of the present disclosure.

As shown in FIG. 5, the camera lens group along an optical axis from an object side to an image side sequentially includes a first lens E1, a second lens E2, a third lens E3, a fourth lens E4, a fifth lens E5, a sixth lens E6, a seventh lens E7, and an image plane S17.

The first lens E1 has a negative refractive power, an object-side surface S1 of the first lens E1 is a concave surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a convex surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a concave surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a convex surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Optionally, the camera lens group may further include an optical filter E8 having an object-side surface S15 and an image-side surface S16. Light from an object passes through the surfaces S1 to S16 sequentially and is finally imaged on the image plane S17.

Optionally, the camera lens group may further include a diaphragm STO disposed between the first lens E1 and the second lens E2, to improve the imaging quality.

Table 7 shows the surface type, the radius of curvature, the thickness, the material, and the conic coefficient of each lens of the camera lens group in the third embodiment. The radius of curvature and the thickness are shown in millimeters (mm). Table 8 shows the high-order coefficients applicable to each aspheric surface in the third embodiment. The surface type of each aspheric surface may be defined by the formula (1) given in the above the first embodiment. Table 9 shows the effective focal lengths f1-f7 of the lenses, the total effective focal length f of the camera lens group, the total track length TTL, and the half of the diagonal length ImgH of the effective pixel area on the image plane S17 in the third embodiment.

TABLE 7

| surface number | surface type | radius of curvature | thickness | material refractive index | abbe number | conic coefficient |
|---|---|---|---|---|---|---|
| OBJ | spherical | infinite | infinite | | | |
| S1 | aspheric | 13.2627 | 0.2700 | 1.65 | 23.5 | −99.0000 |

TABLE 7-continued

| surface number | surface type | radius of curvature | thickness | material refractive index | abbe number | conic coefficient |
|---|---|---|---|---|---|---|
| S2 | aspheric | 4.6560 | 0.3800 | | | 7.3814 |
| STO | spherical | infinite | −0.3383 | | | 0.0000 |
| S3 | aspheric | 1.8074 | 0.7534 | 1.55 | 56.1 | −0.2315 |
| S4 | aspheric | −50.8151 | 0.2403 | | | −99.0000 |
| S5 | aspheric | 2.9586 | 0.2500 | 1.67 | 20.4 | −27.5545 |
| S6 | aspheric | 2.7904 | 0.2537 | | | −21.4210 |
| S7 | aspheric | −43.3823 | 0.6175 | 1.55 | 56.1 | 99.0000 |
| S8 | aspheric | −2.9838 | 0.0812 | | | 3.2775 |
| S9 | aspheric | −6.6036 | 0.2500 | 1.67 | 20.4 | 9.0229 |
| S10 | aspheric | 22.8042 | 0.1130 | | | −99.0000 |
| S11 | aspheric | 1.8788 | 0.2956 | 1.55 | 56.1 | −10.1507 |
| S12 | aspheric | 3.8589 | 0.7431 | | | 0.8036 |
| S13 | aspheric | −2.7162 | 0.2500 | 1.55 | 56.1 | −9.4731 |
| S14 | aspheric | 2.9322 | 0.1273 | | | −25.5116 |
| S15 | spherical | infinite | 0.2100 | 1.52 | 64.2 | |
| S16 | spherical | infinite | 0.2930 | | | |
| S17 | spherical | infinite | | | | |

TABLE 8

| surface number | A4 | A6 | A8 | A10 | A12 |
|---|---|---|---|---|---|
| S1 | −3.4681E−02 | 7.2701E−03 | −1.0960E−04 | −4.2344E−04 | −1.7990E−04 |
| S2 | −3.2324E−02 | 4.1811E−03 | 2.7279E−03 | −1.2308E−03 | 3.4354E−04 |
| S3 | 1.4375E−02 | −3.6219E−03 | 3.4403E−03 | −2.1096E−03 | 2.0694E−03 |
| S4 | −6.4181E−02 | 6.3809E−02 | −4.9156E−02 | 3.6412E−02 | −2.1331E−02 |
| S5 | −3.5294E−02 | −1.3805E−01 | 2.0489E−01 | −1.3698E−01 | 1.2516E−02 |
| S6 | 3.1283E−03 | −1.5096E−01 | 1.9515E−01 | −1.0961E−01 | 1.8010E−02 |
| S7 | −1.6281E−02 | −5.6098E−02 | 3.2464E−02 | −6.4990E−02 | 1.0021E−01 |
| S8 | 6.7944E−02 | −5.7795E−01 | 9.5352E−01 | −8.4334E−01 | 4.2047E−01 |
| S9 | 7.8928E−02 | −6.1167E−01 | 8.2943E−01 | −5.0619E−01 | 1.0100E−01 |
| S10 | −1.4111E−01 | −4.0688E−02 | 1.3825E−01 | −9.9123E−02 | 3.2702E−02 |
| S11 | 3.7220E−02 | −2.2998E−01 | 2.2303E−01 | −1.9451E−01 | 1.1478E−01 |
| S12 | 1.3886E−01 | −2.6107E−01 | 1.7252E−01 | −6.7886E−02 | 1.6375E−02 |
| S13 | −2.0772E−01 | 1.2295E−01 | −3.0890E−02 | 4.0246E−03 | −2.8140E−04 |
| S14 | −8.3703E−02 | 4.2855E−02 | −1.4409E−02 | 2.8001E−03 | −2.9624E−04 |

| surface number | A14 | A16 | A18 | A20 |
|---|---|---|---|---|
| S1 | 1.6868E−04 | −2.5746E−05 | −2.9500E−06 | 7.6383E−08 |
| S2 | −2.0464E−04 | 2.4590E−05 | 8.0621E−08 | −3.0697E−07 |
| S3 | −9.8514E−04 | 1.3997E−04 | 0.0000E+00 | 0.0000E+00 |
| S4 | 7.8258E−03 | −1.2978E−03 | 0.0000E+00 | 0.0000E+00 |
| S5 | 4.5679E−02 | −2.1612E−02 | 0.0000E+00 | 0.0000E+00 |
| S6 | 2.0121E−02 | −3.2208E−03 | 0.0000E+00 | 0.0000E+00 |
| S7 | −7.5687E−02 | 2.6878E−02 | 0.0000E+00 | 0.0000E+00 |
| S8 | −1.0822E−01 | 9.7299E−03 | 0.0000E+00 | 0.0000E+00 |
| S9 | 3.0876E−02 | −1.4083E−02 | 0.0000E+00 | 0.0000E+00 |
| S10 | −5.1265E−03 | 3.1016E−04 | 0.0000E+00 | 0.0000E+00 |
| S11 | −3.9344E−02 | 5.4751E−03 | 0.0000E+00 | 0.0000E+00 |
| S12 | −2.2120E−03 | 1.2598E−04 | 0.0000E+00 | 0.0000E+00 |
| S13 | 1.0050E−05 | −1.4385E−07 | 0.0000E+00 | 0.0000E+00 |
| S14 | 1.5821E−05 | −3.3402E−07 | 0.0000E+00 | 0.0000E+00 |

TABLE 9

| | parameter | | | |
|---|---|---|---|---|
| | f1 (mm) | f2 (mm) | f3 (mm) | f4 (mm) | f5 (mm) |
| value | −11.29 | 3.21 | −181.54 | 5.84 | −7.67 |

| | parameter | | | |
|---|---|---|---|---|
| | f6 (mm) | f7 (mm) | f (mm) | TTL (mm) | ImgH (mm) |
| value | 6.37 | −2.54 | 3.62 | 4.79 | 3.41 |

Figures 6C, 6D:
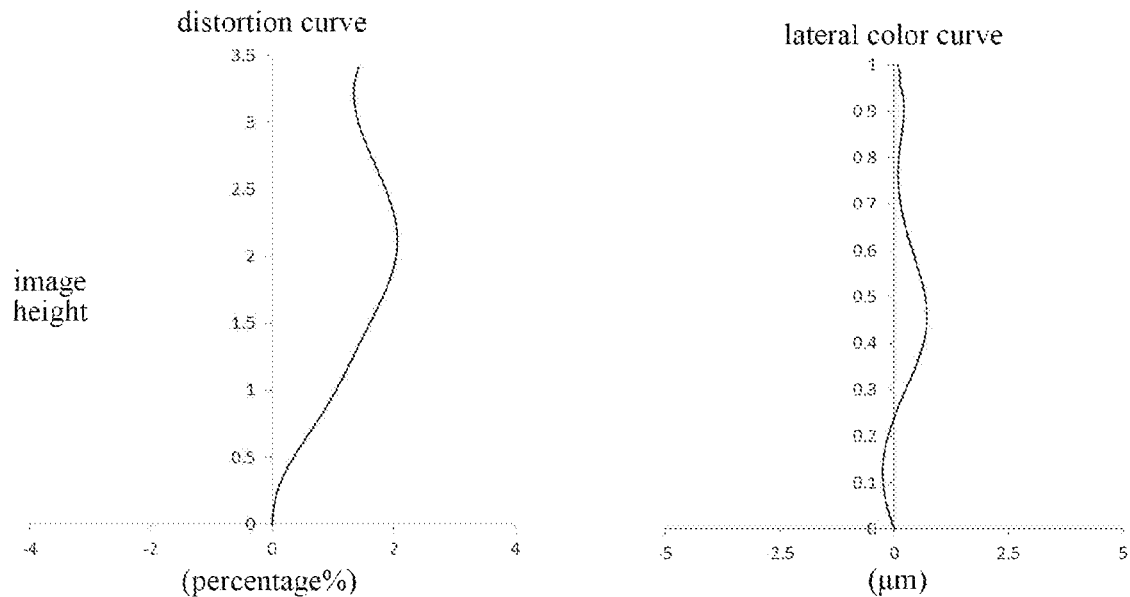

FIG. 6A shows the longitudinal aberration curve of the camera lens group according to the third embodiment, representing deviations of focal points of light of different wavelengths converged after passing through the lens group. FIG. 6B shows the astigmatic curve of the camera lens group according to the third embodiment, representing a curvature of the tangential image plane and a curvature of the sagittal image plane. FIG. 6C shows the distortion curve of the camera lens group according to the third embodiment, representing amounts of distortion at different viewing angles. FIG. 6D shows the lateral color curve of the camera lens group according to the third embodiment, representing deviations of different image heights on the image plane after light passes through the lens group. It can be seen from FIG. 6A to FIG. 6D that the camera lens group given in the third embodiment may achieve a good imaging quality.

Fourth Embodiment

Figure 7:
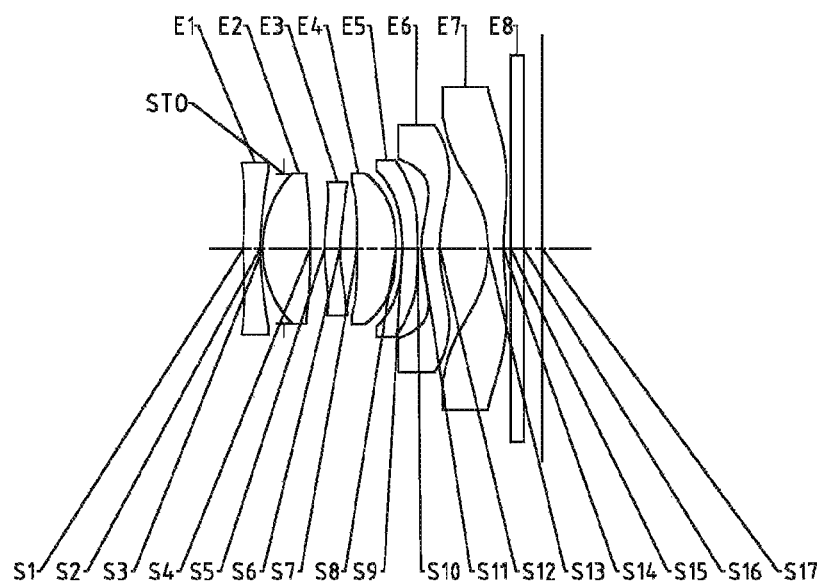
FIG. 7 is a schematic structural diagram illustrating a camera lens group according to the fourth embodiment of the present disclosure.

A camera lens group according to the fourth embodiment of the present disclosure is described below with reference to FIGS. 7-8D. FIG. 7 is a schematic structural diagram illustrating the camera lens group according to the fourth embodiment of the present disclosure.

As shown in FIG. 7, the camera lens group along an optical axis from an object side to an image side sequentially includes a first lens E1, a second lens E2, a third lens E3, a fourth lens E4, a fifth lens E5, a sixth lens E6, a seventh lens E7, and an image plane S17.

The first lens E1 has a negative refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a convex surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a concave surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Optionally, the camera lens group may further include an optical filter E8 having an object-side surface S15 and an image-side surface S16. Light from an object passes through the surfaces S1 to S16 sequentially and is finally imaged on the image plane S17.

Optionally, the camera lens group may further include a diaphragm STO disposed between the first lens E1 and the second lens E2, to improve the imaging quality.

Table 10 shows the surface type, the radius of curvature, the thickness, the material, and the conic coefficient of each lens of the camera lens group in the fourth embodiment. The radius of curvature and the thickness are shown in millimeters (mm). Table 11 shows the high-order coefficients applicable to each aspheric surface in the fourth embodiment. The surface type of each aspheric surface may be defined by the formula (1) given in the above the first embodiment. Table 12 shows the effective focal lengths f1-f7 of the lenses, the total effective focal length f of the camera lens group, the total track length TTL, and the half of the diagonal length ImgH of the effective pixel area on the image plane S17 in the fourth embodiment.

TABLE 10

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 9.7616 | 0.2700 | 1.65 | 23.5 | −83.6707 |
| S2 | aspheric | 4.2544 | 0.3800 | | | −0.9507 |
| STO | spherical | infinite | −0.3383 | | | 0.0000 |
| S3 | aspheric | 1.8515 | 0.7588 | 1.55 | 56.1 | −0.1077 |
| S4 | aspheric | −32.8678 | 0.2304 | | | −50.7893 |
| S5 | aspheric | 2.6987 | 0.2500 | 1.67 | 20.4 | −25.8546 |
| S6 | aspheric | 2.5537 | 0.2747 | | | −18.2095 |
| S7 | aspheric | −34.5836 | 0.6212 | 1.55 | 56.1 | 99.0000 |
| S8 | aspheric | −2.8986 | 0.1004 | | | −6.4499 |
| S9 | aspheric | −3.1395 | 0.2500 | 1.67 | 20.4 | 2.0754 |
| S10 | aspheric | −14.6657 | 0.0558 | | | 99.0000 |
| S11 | aspheric | 1.5851 | 0.2991 | 1.55 | 56.1 | −9.5727 |
| S12 | aspheric | 3.2399 | 0.7687 | | | −2.7666 |
| S13 | aspheric | −2.3795 | 0.2500 | 1.55 | 56.1 | −2.9702 |
| S14 | aspheric | 3.4896 | 0.1160 | | | −33.8389 |
| S15 | spherical | infinite | 0.2100 | 1.52 | 64.2 | |
| S16 | spherical | infinite | 0.2930 | | | |
| S17 | spherical | infinite | | | | |

TABLE 11

| surface number | A4 | A6 | A8 | A10 | A12 |
|---|---|---|---|---|---|
| S1 | −4.1350E−02 | 6.9489E−03 | 4.5318E−04 | 3.1722E−05 | −5.0623E−04 |
| S2 | −3.2350E−02 | 5.7484E−03 | 1.9648E−03 | −9.6354E−04 | 2.8612E−04 |
| S3 | 1.8053E−02 | −1.1439E−02 | 1.4775E−02 | −1.5138E−02 | 1.0711E−02 |
| S4 | −7.3380E−02 | 8.5563E−02 | −7.9326E−02 | 6.4999E−02 | −4.0129E−02 |
| S5 | −1.8599E−02 | −1.7900E−01 | 2.8487E−01 | −2.4802E−01 | 1.0108E−01 |
| S6 | 1.0217E−02 | −1.5051E−01 | 1.9904E−01 | −1.2402E−01 | 2.8805E−02 |
| S7 | −2.1925E−02 | −4.4848E−02 | 4.8937E−02 | −1.1544E−01 | 1.5690E−01 |
| S8 | 8.0341E−02 | −9.1716E−01 | 1.7374E+00 | −1.8058E+00 | 1.0832E+00 |
| S9 | 3.5187E−01 | −1.5549E+00 | 2.7111E+00 | −2.6499E+00 | 1.5131E+00 |
| S10 | −4.7759E−02 | −3.7019E−01 | 7.7787E−01 | −7.6934E−01 | 4.2538E−01 |
| S11 | −3.4428E−02 | −9.0083E−02 | 7.5163E−02 | −8.3447E−02 | 5.5183E−02 |
| S12 | 8.7241E−02 | −1.7354E−01 | 1.0292E−01 | −3.5814E−02 | 7.7733E−03 |
| S13 | −1.6010E−01 | 1.0580E−01 | −2.8412E−02 | 4.0032E−03 | −3.0854E−04 |
| S14 | −7.7010E−02 | 4.2784E−02 | −1.5798E−02 | 3.4301E−03 | −4.1887E−04 |

| surface number | A14 | A16 | A18 | A20 |
|---|---|---|---|---|
| S1 | 2.2098E−04 | −2.5729E−05 | −2.9510E−06 | 7.6503E−08 |
| S2 | −2.0477E−04 | 2.4584E−05 | 8.0621E−08 | −3.0674E−07 |
| S3 | −3.7879E−03 | 4.8399E−04 | 0.0000E+00 | 0.0000E+00 |
| S4 | 1.5845E−02 | −2.8898E−03 | 0.0000E+00 | 0.0000E+00 |
| S5 | 8.9390E−03 | −1.5240E−02 | 0.0000E+00 | 0.0000E+00 |
| S6 | 1.1892E−02 | 5.7805E−04 | 0.0000E+00 | 0.0000E+00 |
| S7 | −1.2147E−01 | 4.3464E−02 | 0.0000E+00 | 0.0000E+00 |
| S8 | −3.5346E−01 | 4.7881E−02 | 0.0000E+00 | 0.0000E+00 |
| S9 | −4.7025E−01 | 6.0320E−02 | 0.0000E+00 | 0.0000E+00 |
| S10 | −1.2639E−01 | 1.5717E−02 | 0.0000E+00 | 0.0000E+00 |
| S11 | −2.0691E−02 | 3.1460E−03 | 0.0000E+00 | 0.0000E+00 |
| S12 | −9.5990E−04 | 5.0131E−05 | 0.0000E+00 | 0.0000E+00 |
| S13 | 1.2385E−05 | −2.0308E−07 | 0.0000E+00 | 0.0000E+00 |
| S14 | 2.6707E−05 | −6.8748E−07 | 0.0000E+00 | 0.0000E+00 |

TABLE 12

| | parameter | | | | |
|---|---|---|---|---|---|
| | f1 (mm) | f2 (mm) | f3 (mm) | f4 (mm) | f5 (mm) |
| value | −11.95 | 3.24 | −229.49 | 5.76 | −6.05 |

| | parameter | | | |
|---|---|---|---|---|
| | f6 (mm) | f7 (mm) | f (mm) | TTL (mm) | ImgH (mm) |
| value | 5.34 | −2.55 | 3.62 | 4.79 | 3.41 |

Figure 8A:
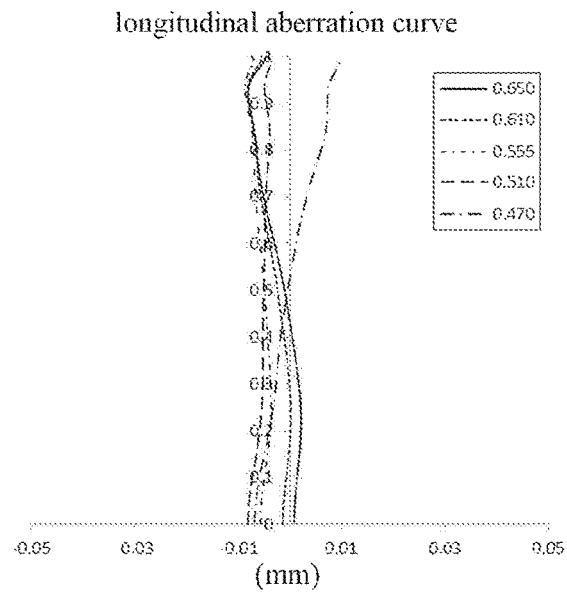
FIGS. 8A-8D respectively illustrate a longitudinal aberration curve, an astigmatic curve, a distortion curve, and a lateral color curve of the camera lens group according to the fourth embodiment.
Figure 8B:
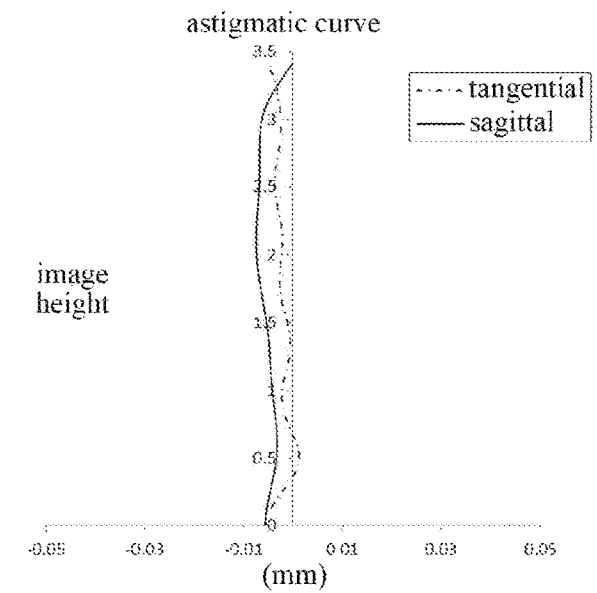
Figure 8C:
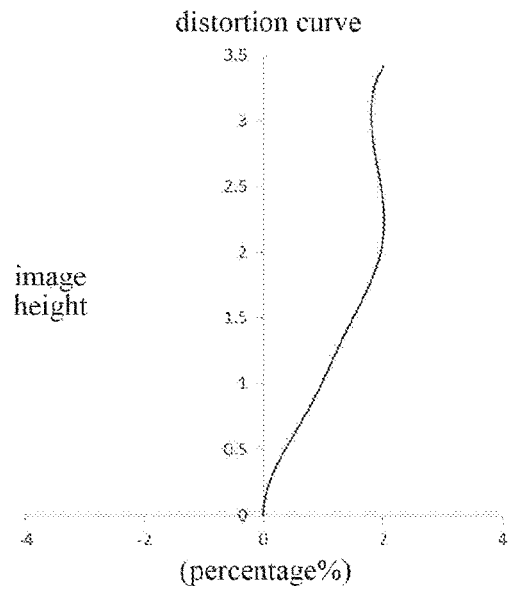
Figure 8D:
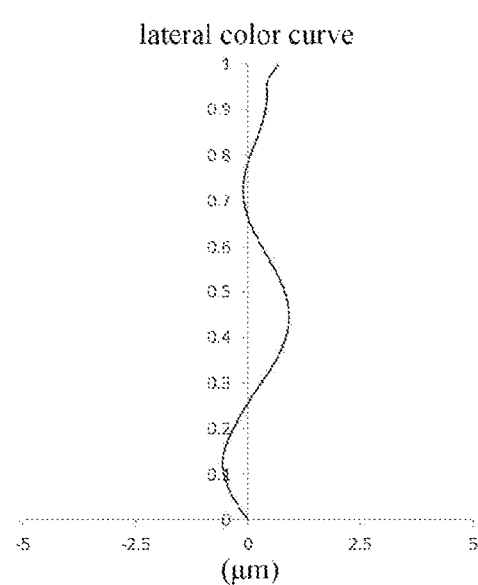

FIG. 8A shows the longitudinal aberration curve of the camera lens group according to the fourth embodiment, representing deviations of focal points of light of different wavelengths converged after passing through the lens group. FIG. 8B shows the astigmatic curve of the camera lens group according to the fourth embodiment, representing a curvature of the tangential image plane and a curvature of the sagittal image plane. FIG. 8C shows the distortion curve of the camera lens group according to the fourth embodiment, representing amounts of distortion at different viewing angles. FIG. 8D shows the lateral color curve of the camera lens group according to the fourth embodiment, representing deviations of different image heights on the image plane after light passes through the lens group. It can be seen from FIG. 8A to FIG. 8D that the camera lens group given in the fourth embodiment may achieve a good imaging quality.

Fifth Embodiment

Figure 9:
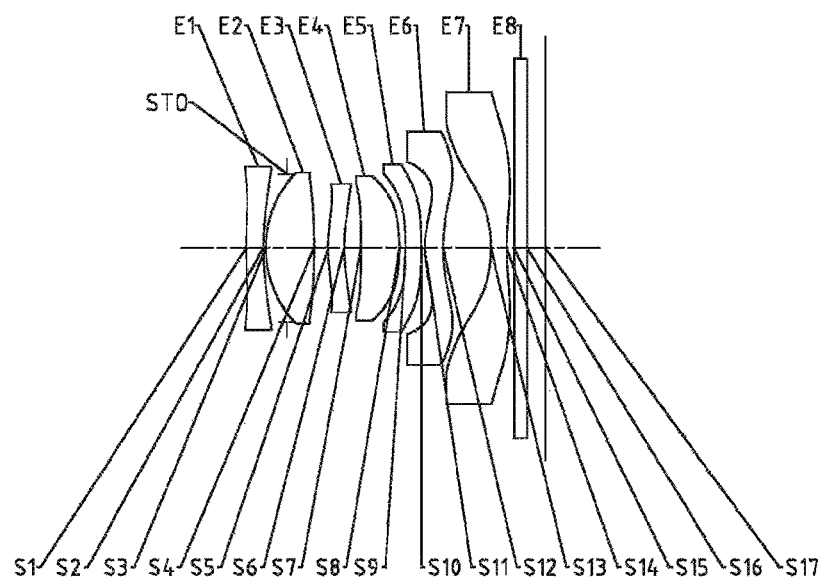
FIG. 9 is a schematic structural diagram illustrating a camera lens group according to the fifth embodiment of the present disclosure.

A camera lens group according to the fifth embodiment of the present disclosure is described below with reference to FIGS. 9-10D. FIG. 9 is a schematic structural diagram illustrating the camera lens group according to the fifth embodiment of the present disclosure.

As shown in FIG. 9, the camera lens group along an optical axis from an object side to an image side sequentially includes a first lens E1, a second lens E2, a third lens E3, a fourth lens E4, a fifth lens E5, a sixth lens E6, a seventh lens E7, and an image plane S17.

The first lens E1 has a negative refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a convex surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a concave surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Optionally, the camera lens group may further include an optical filter E8 having an object-side surface S15 and an image-side surface S16. Light from an object passes through the surfaces S1 to S16 sequentially and is finally imaged on the image plane S17.

Optionally, the camera lens group may further include a diaphragm STO disposed between the first lens E1 and the second lens E2, to improve the imaging quality.

Table 13 shows the surface type, the radius of curvature, the thickness, the material, and the conic coefficient of each lens of the camera lens group in the fifth embodiment. The radius of curvature and the thickness are shown in millimeters (mm). Table 14 shows the high-order coefficients applicable to each aspheric surface in the fifth embodiment. The surface type of each aspheric surface may be defined by the formula (1) given in the above the first embodiment. Table 15 shows the effective focal lengths f1-f7 of the lenses, the total effective focal length f of the camera lens group, the total track length TTL, and the half of the diagonal length ImgH of the effective pixel area on the image plane S17 in the fifth embodiment.

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | aspheric | 9.5880 | 0.2700 | 1.65 | 23.5 | −74.5342 |
| S2 | aspheric | 4.1781 | 0.3800 | | | −0.1421 |
| STO | spherical | infinite | −0.3383 | | | 0.0000 |
| S3 | aspheric | 1.8410 | 0.7673 | 1.55 | 56.1 | 0.1505 |
| S4 | aspheric | −26.2836 | 0.2305 | | | −99.0000 |
| S5 | aspheric | 2.7384 | 0.2500 | 1.67 | 20.4 | −29.2934 |
| S6 | aspheric | 2.5480 | 0.2724 | | | −17.8533 |
| S7 | aspheric | −32.3553 | 0.6148 | 1.55 | 56.1 | 99.0000 |
| S8 | aspheric | −2.9409 | 0.1089 | | | −18.4996 |
| S9 | aspheric | −3.3676 | 0.2500 | 1.67 | 20.4 | 3.9920 |
| S10 | aspheric | −14.7085 | 0.0559 | | | 99.0000 |
| S11 | aspheric | 1.6321 | 0.2927 | 1.55 | 56.1 | −9.7568 |
| S12 | aspheric | 3.1457 | 0.7659 | | | −0.9532 |
| S13 | aspheric | −2.4840 | 0.2500 | 1.55 | 56.1 | −3.7973 |
| S14 | aspheric | 3.3638 | 0.1167 | | | −32.6290 |
| S15 | spherical | infinite | 0.2100 | 1.52 | 64.2 | |
| S16 | spherical | infinite | 0.2930 | | | |
| S17 | spherical | infinite | | | | |

TABLE 14

| surface number | A4 | A6 | A8 | A10 | A12 |
|---|---|---|---|---|---|
| S1 | −4.5039E−02 | 7.3848E−03 | 1.1989E−03 | −1.4957E−04 | −5.7205E−04 |
| S2 | −4.2278E−02 | 1.1052E−02 | 1.5062E−04 | −3.6017E−04 | 1.8449E−04 |
| S3 | 6.0817E−03 | −3.7583E−03 | 6.1443E−04 | −4.9018E−05 | 2.3448E−06 |
| S4 | −7.2604E−02 | 8.5614E−02 | −8.3174E−02 | 7.0035E−02 | −4.3265E−02 |
| S5 | −7.3362E−03 | −2.1997E−01 | 3.8345E−01 | −3.9987E−01 | 2.4939E−01 |
| S6 | 5.8587E−03 | −1.4169E−01 | 1.8714E−01 | −1.0707E−01 | 1.2189E−02 |
| S7 | −2.0106E−02 | −4.2062E−02 | 3.6255E−02 | −8.1720E−02 | 1.1137E−01 |
| S8 | −1.2176E−02 | −6.7763E−01 | 1.3228E+00 | −1.3585E+00 | 7.9421E−01 |
| S9 | 3.0378E+00 | −1.3513E+00 | 2.2936E+00 | −2.1675E+00 | 1.1951E+00 |
| S10 | −4.2109E−02 | −3.6670E−01 | 7.3764E−01 | −7.0972E−01 | 3.8460E−01 |
| S11 | −3.4658E−02 | −9.6988E−02 | 9.0356E−02 | −9.8244E−02 | 6.2947E−02 |
| S12 | 6.3694E−02 | −1.5132E−01 | 8.7112E−02 | −2.8851E−02 | 5.9284E−03 |
| S13 | −1.7880E−01 | 1.1877E−01 | −3.3372E−02 | 4.9639E−03 | −4.0264E−04 |
| S14 | −8.1470E−02 | 4.6220E−02 | −1.7192E−02 | 3.7626E−03 | −4.6530E−04 |

| surface number | A14 | A16 | A18 | A20 |
|---|---|---|---|---|
| S1 | 2.4292E−04 | −2.5721E−05 | −2.9510E−06 | 7.6446E−08 |
| S2 | −2.0481E−04 | 2.4587E−05 | 8.1593E−08 | −3.0668E−07 |
| S3 | −6.5813E−08 | 7.9564E−10 | 0.0000E+00 | 0.0000E+00 |
| S4 | 1.6698E−02 | −2.8824E−03 | 0.0000E+00 | 0.0000E+00 |
| S5 | −7.1446E−02 | 3.1117E−03 | 0.0000E+00 | 0.0000E+00 |
| S6 | 2.3567E−02 | −3.5389E−03 | 0.0000E+00 | 0.0000E+00 |
| S7 | −8.6837E−02 | 3.2573E−02 | 0.0000E+00 | 0.0000E+00 |
| S8 | −2.5072E−01 | 3.2498E−02 | 0.0000E+00 | 0.0000E+00 |
| S9 | −3.5879E−01 | 4.4304E−02 | 0.0000E+00 | 0.0000E+00 |
| S10 | −1.1301E−01 | 1.4024E−02 | 0.0000E+00 | 0.0000E+00 |
| S11 | −2.2794E−02 | 3.3649E−03 | 0.0000E+00 | 0.0000E+00 |
| S12 | −6.9674E−04 | 3.4740E−05 | 0.0000E+00 | 0.0000E+00 |
| S13 | 1.6919E−05 | −2.8861E−07 | 0.0000E+00 | 0.0000E+00 |
| S14 | 3.0169E−05 | −7.9193E−07 | 0.0000E+00 | 0.0000E+00 |

TABLE 15

| parameter | | | | |
|---|---|---|---|---|
| f1 (mm) | f2 (mm) | f3 (mm) | f4 (mm) | f5 (mm) |
| value −11.74 | 3.18 | −115.89 | 5.88 | −6.62 |

| parameter | | | | |
|---|---|---|---|---|
| f6 (mm) | f7 (mm) | f (mm) | TTL (mm) | ImgH (mm) |
| value 5.82 | −2.58 | 3.63 | 4.79 | 3.41 |

Figures 10A, 10B:
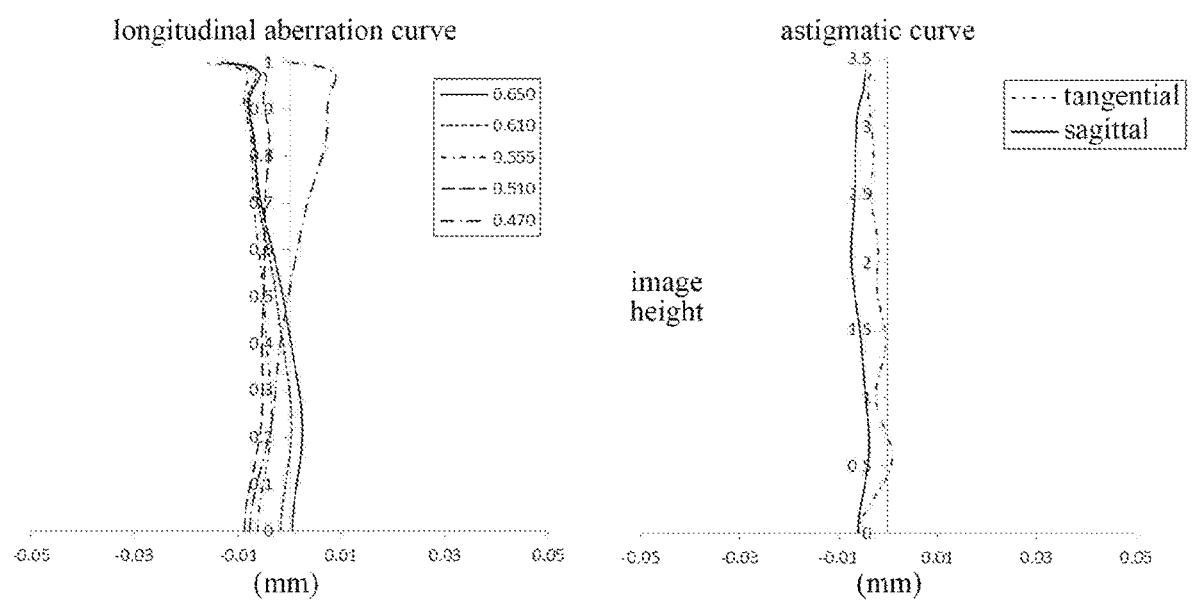

FIG. 10A shows the longitudinal aberration curve of the camera lens group according to the fifth embodiment, representing deviations of focal points of light of different wavelengths converged after passing through the lens group. FIG. 10B shows the astigmatic curve of the camera lens group according to the fifth embodiment, representing a curvature of the tangential image plane and a curvature of the sagittal image plane. FIG. 10C shows the distortion curve of the camera lens group according to the fifth embodiment, representing amounts of distortion at different viewing angles. FIG. 10D shows the lateral color curve of the camera lens group according to the fifth embodiment, representing deviations of different image heights on the image plane after light passes through the lens group. It can be seen from FIG. 10A to FIG. 10D that the camera lens group given in the fifth embodiment may achieve a good imaging quality.

Sixth Embodiment

A camera lens group according to the sixth embodiment of the present disclosure is described below with reference to FIGS. 11-12D. FIG. 11 is a schematic structural diagram illustrating the camera lens group according to the sixth embodiment of the present disclosure.

As shown in FIG. 11, the camera lens group along an optical axis from an object side to an image side sequentially includes a first lens E1, a second lens E2, a third lens E3, a fourth lens E4, a fifth lens E5, a sixth lens E6, a seventh lens E7, and an image plane S17.

The first lens E1 has a negative refractive power, an object-side surface S1 of the first lens E1 is a concave surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a convex surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a concave surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Optionally, the camera lens group may further include an optical filter E8 having an object-side surface S15 and an image-side surface S16. Light from an object passes through the surfaces S1 to S16 sequentially and is finally imaged on the image plane S17.

Optionally, the camera lens group may further include a diaphragm STO disposed between the first lens E1 and the second lens E2, to improve the imaging quality.

Table 16 shows the surface type, the radius of curvature, the thickness, the material, and the conic coefficient of each lens of the camera lens group in the sixth embodiment. The radius of curvature and the thickness are shown in millimeters (mm). Table 17 shows the high-order coefficients applicable to each aspheric surface in the sixth embodiment. The surface type of each aspheric surface may be defined by the formula (1) given in the above the first embodiment. Table 18 shows the effective focal lengths f1-f7 of the lenses, the total effective focal length f of the camera lens group, the total track length TTL, and the half of the diagonal length ImgH of the effective pixel area on the image plane S17 in the sixth embodiment.

TABLE 16

| surface number | surface type | radius of curvature | thickness | material refractive index | abbe number | conic coefficient |
|---|---|---|---|---|---|---|
| OBJ | spherical | infinite | infinite | | | |
| S1 | aspheric | −27.1319 | 0.2700 | 1.65 | 23.5 | 99.0000 |
| S2 | aspheric | 8.1466 | 0.3800 | | | −98.4478 |
| STO | spherical | infinite | −0.3383 | | | 0.0000 |
| S3 | aspheric | 1.8158 | 0.7528 | 1.55 | 56.1 | −0.5769 |
| S4 | aspheric | −27.9367 | 0.2334 | | | −99.0000 |
| S5 | aspheric | 2.3794 | 0.2400 | 1.67 | 20.4 | −18.0278 |
| S6 | aspheric | 2.2719 | 0.3063 | | | −15.0576 |
| S7 | aspheric | −88.0819 | 0.6038 | 1.55 | 56.1 | −99.0000 |
| S8 | aspheric | −3.3578 | 0.1087 | | | 4.7740 |
| S9 | aspheric | −9.5042 | 0.2400 | 1.67 | 20.4 | 36.4172 |
| S10 | aspheric | 9.7472 | 0.1050 | | | −99.0000 |
| S11 | aspheric | 1.7434 | 0.2828 | 1.55 | 56.1 | −5.6070 |
| S12 | aspheric | 4.0193 | 0.7390 | | | −15.3613 |
| S13 | aspheric | −2.7252 | 0.2400 | 1.55 | 56.1 | −11.7331 |
| S14 | aspheric | 2.9096 | 0.1235 | | | −27.0719 |
| S15 | spherical | infinite | 0.2100 | 1.52 | 64.2 | |
| S16 | spherical | infinite | 0.2930 | | | |
| S17 | spherical | infinite | | | | |

TABLE 17

| surface number | A4 | A6 | A8 | A10 | A12 |
|---|---|---|---|---|---|
| S1 | −2.7182E−02 | 1.0322E−02 | −8.3968E−04 | −8.3890E−04 | 2.2425E−05 |
| S2 | 3.4309E−03 | 4.8567E−03 | 4.1057E−04 | −7.4422E−04 | 3.0322E−04 |
| S3 | 7.9444E−03 | 1.2327E−02 | −1.2075E−02 | 6.6302E−03 | −1.8892E−04 |
| S4 | −6.7531E−02 | 7.6452E−02 | −7.8034E−02 | 6.8180E−02 | −4.1100E−02 |
| S5 | 7.9289E−04 | −1.6572E−01 | 2.4594E−01 | −2.1257E−01 | 9.5492E−02 |
| S6 | 4.2463E−02 | −1.8419E−01 | 2.5232E−01 | −1.9995E−01 | 9.7543E−02 |
| S7 | −2.8270E−02 | −5.1666E−02 | 7.5578E−02 | −1.7486E−01 | 2.2469E−01 |
| S8 | 4.8395E−02 | −6.2857E−01 | 1.1971E+00 | −1.2510E+00 | 7.6606E−01 |
| S9 | 1.5402E−01 | −9.4111E−01 | 1.5325E+00 | −1.3308E+00 | 6.5270E−01 |
| S10 | −3.6281E−02 | −3.8396E−01 | 7.1381E−01 | −6.4407E−01 | 3.3137E−01 |
| S11 | −2.7283E−02 | −1.0317E−01 | 8.5264E−02 | −7.6946E−02 | 4.3431E−02 |
| S12 | 1.3520E−01 | −1.7738E−01 | 8.6640E−02 | −2.4183E−02 | 4.1872E−03 |
| S13 | −2.5995E−01 | 1.8278E−01 | −5.8090E−02 | 1.0395E−02 | −1.0704E−03 |
| S14 | −9.7142E−02 | 5.9956E−02 | −2.2364E−02 | 4.7972E−03 | −5.7636E−04 |

| surface number | A14 | A16 | A18 | A20 |
|---|---|---|---|---|
| S1 | 1.3684E−04 | −2.5726E−05 | −2.9511E−06 | 7.6655E−08 |
| S2 | −2.0480E−04 | 2.4592E−05 | 7.9947E−08 | −3.0692E−07 |
| S3 | −1.0576E−03 | 2.9745E−04 | 0.0000E+00 | 0.0000E+00 |
| S4 | 1.4897E−02 | −2.4063E−03 | 0.0000E+00 | 0.0000E+00 |
| S5 | 4.1027E−04 | −1.2141E−02 | 0.0000E+00 | 0.0000E+00 |
| S6 | −1.6178E−02 | 2.6890E−03 | 0.0000E+00 | 0.0000E+00 |
| S7 | −1.5755E−01 | 5.1341E−02 | 0.0000E+00 | 0.0000E+00 |
| S8 | −2.5812E−01 | 3.6513E−02 | 0.0000E+00 | 0.0000E+00 |
| S9 | −1.6392E−01 | 1.3665E−02 | 0.0000E+00 | 0.0000E+00 |
| S10 | −9.3037E−02 | 1.0924E−02 | 0.0000E+00 | 0.0000E+00 |
| S11 | −1.4729E−02 | 2.2354E−03 | 0.0000E+00 | 0.0000E+00 |
| S12 | −4.1912E−04 | 1.8020E−05 | 0.0000E+00 | 0.0000E+00 |
| S13 | 5.8439E−05 | −1.2862E−06 | 0.0000E+00 | 0.0000E+00 |
| S14 | 3.6092E−05 | −9.1279E−07 | 0.0000E+00 | 0.0000E+00 |

TABLE 18

| parameter | | | | |
|---|---|---|---|---|
| f1 (mm) | f2 (mm) | f3 (mm) | f4 (mm) | f5 (mm) |
| value −9.71 | 3.15 | −697.36 | 6.38 | −7.19 |

| parameter | | | | |
|---|---|---|---|---|
| f6 (mm) | f7 (mm) | f (mm) | TTL (mm) | ImgH (mm) |
| value 5.40 | −2.54 | 3.57 | 4.79 | 3.41 |

Figure 12A:
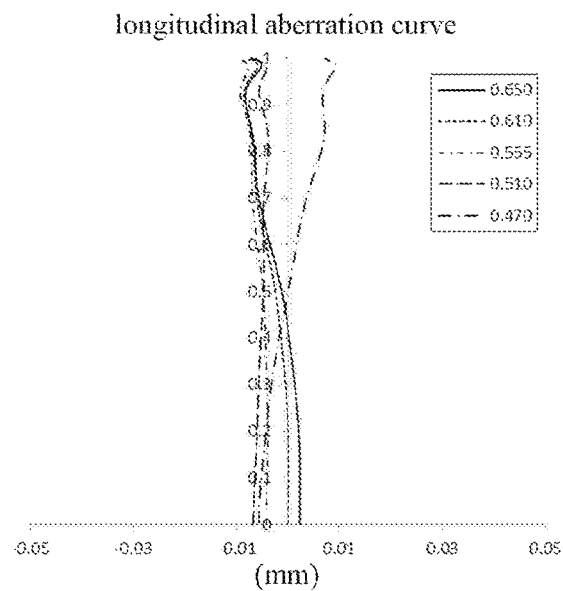
FIGS. 12A-12D respectively illustrate a longitudinal aberration curve, an astigmatic curve, a distortion curve, and a lateral color curve of the camera lens group according to the sixth embodiment.
Figure 12B:
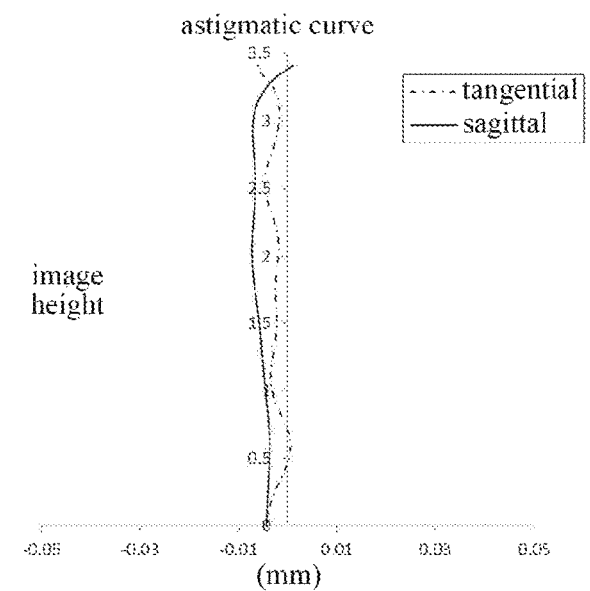
Figure 12C:
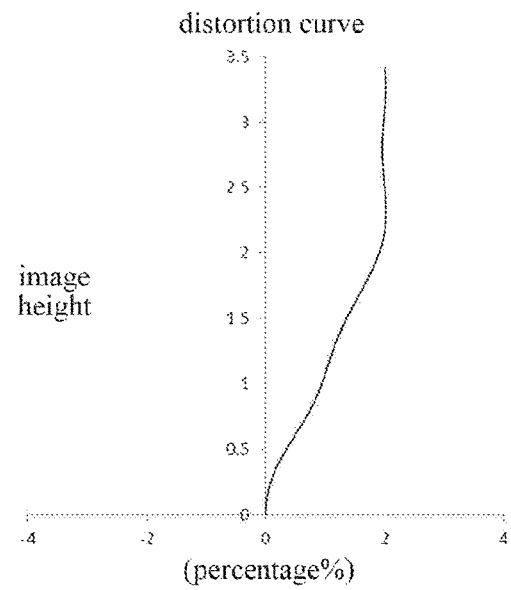
Figure 12D:
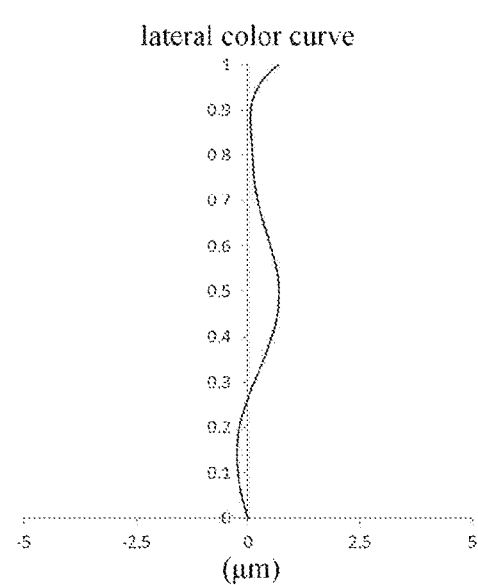

FIG. 12A shows the longitudinal aberration curve of the camera lens group according to the sixth embodiment, representing deviations of focal points of light of different wavelengths converged after passing through the lens group. FIG. 12B shows the astigmatic curve of the camera lens group according to the sixth embodiment, representing a curvature of the tangential image plane and a curvature of the sagittal image plane. FIG. 12C shows the distortion curve of the camera lens group according to the sixth embodiment, representing amounts of distortion at different viewing angles. FIG. 12D shows the lateral color curve of the camera lens group according to the sixth embodiment, representing deviations of different image heights on the image plane after light passes through the lens group. It can be seen from FIG. 12A to FIG. 12D that the camera lens group given in the sixth embodiment may achieve a good imaging quality.

Seventh Embodiment

Figure 13:
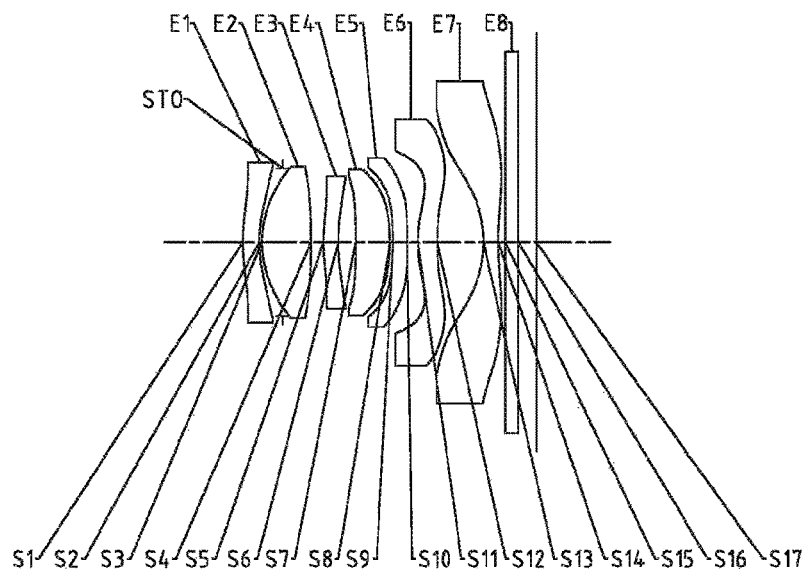
FIG. 13 is a schematic structural diagram illustrating a camera lens group according to the seventh embodiment of the present disclosure.

A camera lens group according to the seventh embodiment of the present disclosure is described below with reference to FIGS. 13-14D. FIG. 13 is a schematic structural diagram illustrating the camera lens group according to the seventh embodiment of the present disclosure.

As shown in FIG. 13, the camera lens group along an optical axis from an object side to an image side sequentially includes a first lens E1, a second lens E2, a third lens E3, a fourth lens E4, a fifth lens E5, a sixth lens E6, a seventh lens E7, and an image plane S17.

The first lens E1 has a negative refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a convex surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a concave surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Optionally, the camera lens group may further include an optical filter E8 having an object-side surface S15 and an image-side surface S16. Light from an object passes through the surfaces S1 to S16 sequentially and is finally imaged on the image plane S17.

Optionally, the camera lens group may further include a diaphragm STO disposed between the first lens E1 and the second lens E2, to improve the imaging quality.

Table 19 shows the surface type, the radius of curvature, the thickness, the material, and the conic coefficient of each lens of the camera lens group in the seventh embodiment. The radius of curvature and the thickness are shown in millimeters (mm). Table 20 shows the high-order coefficients applicable to each aspheric surface in the seventh embodiment. The surface type of each aspheric surface may be defined by the formula (1) given in the above the first embodiment. Table 21 shows the effective focal lengths f1-f7 of the lenses, the total effective focal length f of the camera lens group, the total track length TTL, and the half of the diagonal length ImgH of the effective pixel area on the image plane S17 in the seventh embodiment.

TABLE 19

| surface number | surface type | radius of curvature | thickness | material refractive index | abbe number | conic coefficient |
|---|---|---|---|---|---|---|
| OBJ | spherical | infinite | infinite | | | |
| S1 | aspheric | 3.4766 | 0.2700 | 1.65 | 23.5 | −4.5650 |
| S2 | aspheric | 2.1642 | 0.3800 | | | −5.9924 |
| STO | spherical | infinite | −0.3383 | | | 0.0000 |
| S3 | aspheric | 1.6905 | 0.7974 | 1.55 | 56.1 | −0.4289 |
| S4 | aspheric | −25.8904 | 0.2055 | | | −71.8619 |
| S5 | aspheric | 3.0958 | 0.2400 | 1.67 | 20.4 | −31.0185 |
| S6 | aspheric | 2.8046 | 0.2819 | | | −13.8739 |
| S7 | aspheric | −15.4709 | 0.5587 | 1.55 | 56.1 | −99.0000 |
| S8 | aspheric | −3.0795 | 0.0541 | | | −33.1625 |
| S9 | aspheric | −6.8467 | 0.2400 | 1.67 | 20.4 | 20.4845 |
| S10 | aspheric | 62.1236 | 0.1723 | | | −99.0000 |
| S11 | aspheric | 2.0632 | 0.3191 | 1.55 | 56.1 | −7.2685 |
| S12 | aspheric | 5.5684 | 0.7511 | | | −41.1685 |
| S13 | aspheric | −1.9803 | 0.2400 | 1.55 | 56.1 | −1.5359 |
| S14 | aspheric | 4.5496 | 0.1151 | | | −25.6089 |
| S15 | spherical | infinite | 0.2100 | 1.52 | 64.2 | |
| S16 | spherical | infinite | 0.2930 | | | |
| S17 | spherical | infinite | | | | |

TABLE 20

| surface number | A4 | A6 | A8 | A10 | A12 |
|---|---|---|---|---|---|
| S1 | −5.5858E−02 | −1.8888E−03 | 4.7135E−03 | 9.4097E−04 | −1.2362E−03 |
| S2 | −4.2217E−02 | 1.0893E−02 | −1.2438E−03 | 3.0281E−03 | −7.5651E−04 |
| S3 | −4.2440E−02 | 4.4997E−02 | −2.6561E−02 | 9.4237E−03 | −1.9294E−03 |
| S4 | −8.0878E−02 | 8.1650E−02 | −6.5300E−02 | 3.3376E−02 | −9.0671E−03 |
| S5 | −5.2414E−02 | −8.6541E−02 | 1.5267E−01 | −6.6707E−02 | −6.0439E−02 |
| S6 | −4.3840E−02 | −3.7465E−02 | 7.3242E−02 | −2.5345E−02 | −1.3861E−02 |
| S7 | −1.4356E−02 | −6.9315E−02 | 1.0496E−01 | −2.1777E−01 | 2.6320E−01 |
| S8 | −1.5996E−01 | −3.7199E−02 | 1.5391E−01 | −2.8785E−01 | 3.0307E−01 |
| S9 | −1.1750E−01 | −6.8802E−02 | 2.5085E−01 | −4.6894E−01 | 4.8488E−01 |
| S10 | −2.6602E−01 | 2.1283E−01 | −1.0488E−01 | −4.0603E−02 | 9.6719E−02 |
| S11 | −7.6947E−03 | −1.2835E−01 | 9.8496E−02 | −7.5467E−02 | 4.2208E−02 |
| S12 | 1.9808E−01 | −2.9060E−01 | 1.8763E−01 | −7.4315E−02 | 1.8264E−02 |
| S13 | −3.3052E−02 | −2.0969E−02 | 3.3637E−02 | −1.2263E−02 | 2.0110E−03 |
| S14 | −5.1418E−02 | 1.6223E−02 | −3.6671E−03 | 5.0937E−04 | −3.8125E−05 |

| surface number | A14 | A16 | A18 | A20 |
|---|---|---|---|---|
| S1 | 3.0791E−04 | −2.5723E−05 | −2.9512E−06 | 7.6677E−08 |
| S2 | −2.0467E−04 | 2.4586E−05 | 8.0477E−08 | −3.0695E−07 |
| S3 | 2.0878E−04 | −9.2133E−06 | 0.0000E+00 | 0.0000E+00 |
| S4 | 1.1913E−03 | −5.9866E−05 | 0.0000E+00 | 0.0000E+00 |
| S5 | 9.0623E−02 | −3.2699E−02 | 0.0000E+00 | 0.0000E+00 |
| S6 | 1.5784E−02 | 2.6052E−03 | 0.0000E+00 | 0.0000E+00 |
| S7 | −1.8214E−01 | 6.0616E−02 | 0.0000E+00 | 0.0000E+00 |
| S8 | −1.6117E−01 | 3.3263E−02 | 0.0000E+00 | 0.0000E+00 |
| S9 | −2.4396E−01 | 4.5117E−02 | 0.0000E+00 | 0.0000E+00 |
| S10 | −5.3352E−02 | 9.9263E−03 | 0.0000E+00 | 0.0000E+00 |
| S11 | −1.4040E−02 | 1.8386E−03 | 0.0000E+00 | 0.0000E+00 |
| S12 | −2.5223E−03 | 1.4702E−04 | 0.0000E+00 | 0.0000E+00 |
| S13 | −1.5555E−04 | 4.6221E−06 | 0.0000E+00 | 0.0000E+00 |
| S14 | 1.4234E−06 | −2.0797E−08 | 0.0000E+00 | 0.0000E+00 |

TABLE 21

| parameter | | | | |
|---|---|---|---|---|
| f1 (mm) | f2 (mm) | f3 (mm) | f4 (mm) | f5 (mm) |
| value −9.69 | 2.94 | −66.78 | 6.93 | −9.25 |

| parameter | | | | |
|---|---|---|---|---|
| f6 (mm) | f7 (mm) | f (mm) | TTL (mm) | ImgH (mm) |
| value 5.82 | −2.49 | 3.68 | 4.79 | 3.41 |

Figures 14A, 14B:
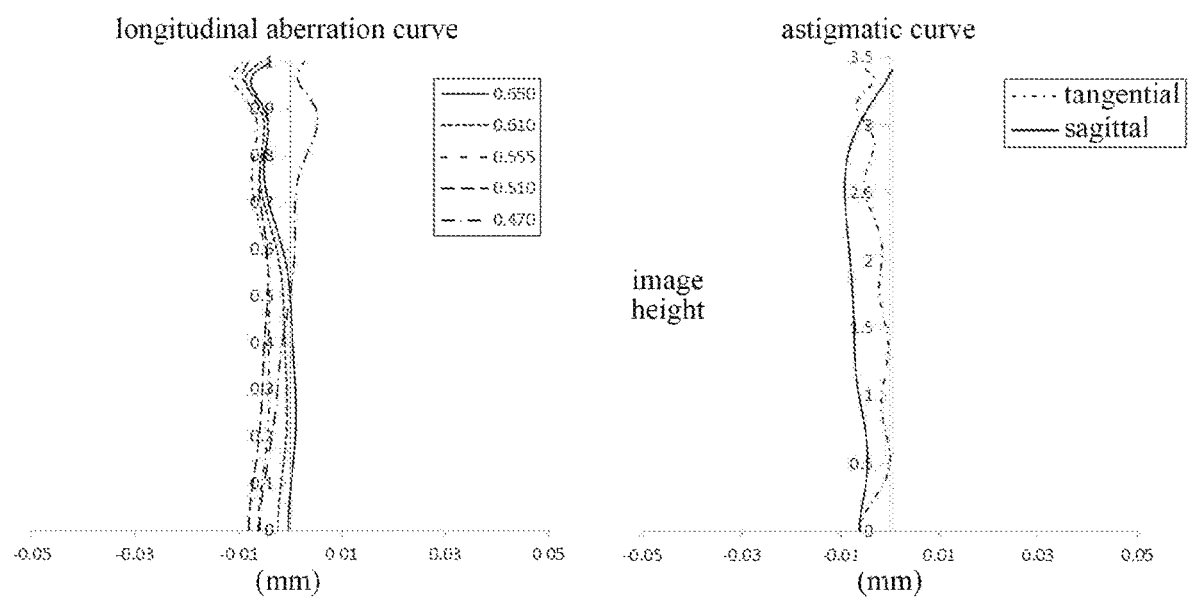
FIGS. 14A-14D respectively illustrate a longitudinal aberration curve, an astigmatic curve, a distortion curve, and a lateral color curve of the camera lens group according to the seventh embodiment.
Figures 14C, 14D:
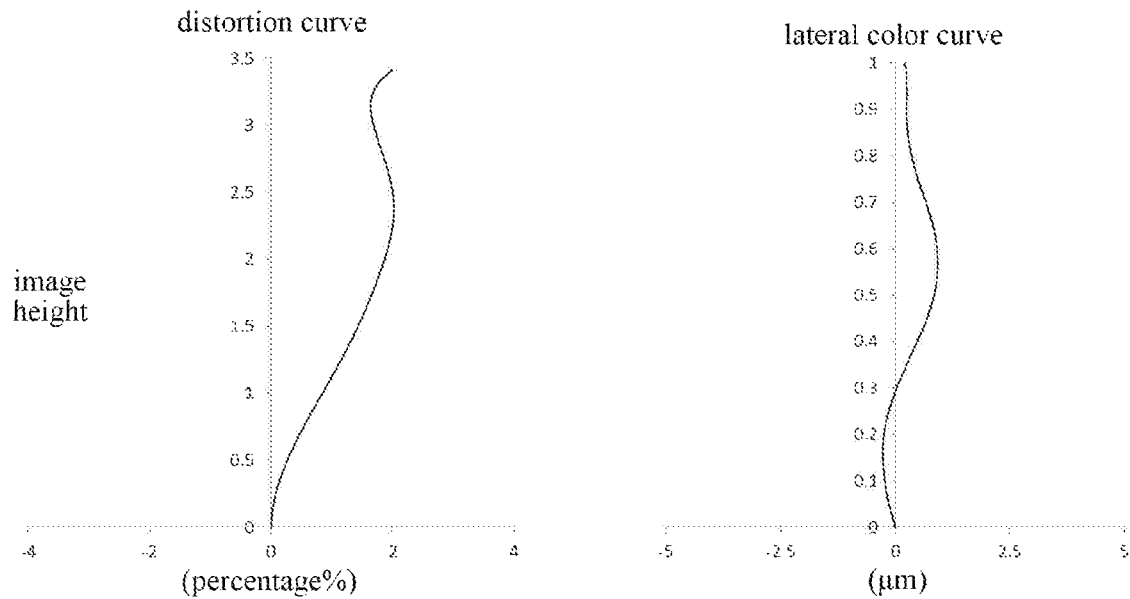

FIG. 14A shows the longitudinal aberration curve of the camera lens group according to the seventh embodiment, representing deviations of focal points of light of different wavelengths converged after passing through the lens group. FIG. 14B shows the astigmatic curve of the camera lens group according to the seventh embodiment, representing a curvature of the tangential image plane and a curvature of the sagittal image plane. FIG. 14C shows the distortion curve of the camera lens group according to the seventh embodiment, representing amounts of distortion at different viewing angles. FIG. 14D shows the lateral color curve of the camera lens group according to the seventh embodiment, representing deviations of different image heights on the image plane after light passes through the lens group. It can be seen from FIG. 14A to FIG. 14D that the camera lens group given in the seventh embodiment may achieve a good imaging quality.

Eighth Embodiment

Figure 15:
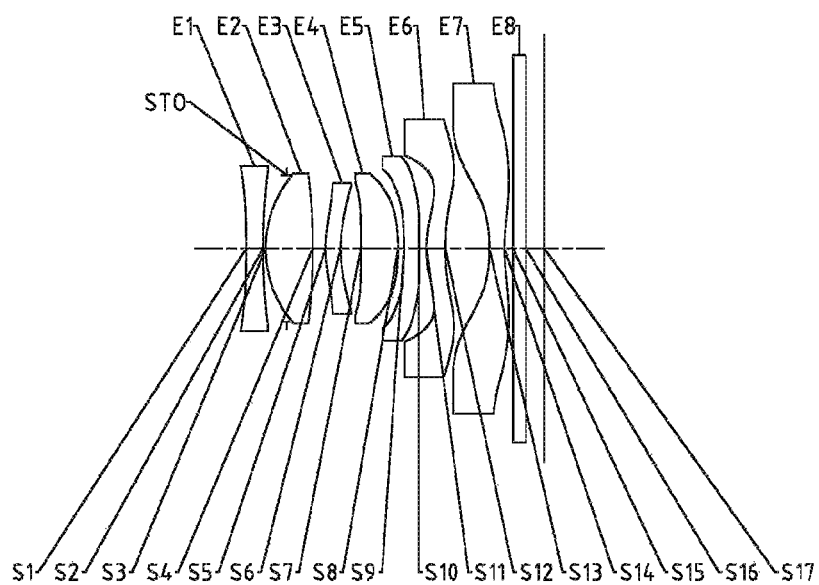
FIG. 15 is a schematic structural diagram illustrating a camera lens group according to the eighth embodiment of the present disclosure.

A camera lens group according to the eighth embodiment of the present disclosure is described below with reference to FIGS. 15-16D. FIG. 15 is a schematic structural diagram illustrating the camera lens group according to the eighth embodiment of the present disclosure.

As shown in FIG. 15, the camera lens group along an optical axis from an object side to an image side sequentially includes a first lens E1, a second lens E2, a third lens E3, a fourth lens E4, a fifth lens E5, a sixth lens E6, a seventh lens E7, and an image plane S17.

The first lens E1 has a negative refractive power, an object-side surface S1 of the first lens E1 is a concave surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a convex surface, and the object-side surface S3 and the image-side surface S4 of the second lens E2 are both aspheric surfaces.

The third lens E3 has a positive refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a concave surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a concave surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a concave surface, an image-side surface S14 of the seventh lens E7 is a concave surface, and the object-side surface S13 and the image-side surface S14 of the seventh lens E7 are both aspheric surfaces.

Optionally, the camera lens group may further include an optical filter E8 having an object-side surface S15 and an image-side surface S16. Light from an object passes through the surfaces S1 to S16 sequentially and is finally imaged on the image plane S17.

Optionally, the camera lens group may further include a diaphragm STO disposed between the first lens E1 and the second lens E2, to improve the imaging quality.

Table 22 shows the surface type, the radius of curvature, the thickness, the material, and the conic coefficient of each lens of the camera lens group in the eighth embodiment. The radius of curvature and the thickness are shown in millimeters (mm). Table 23 shows the high-order coefficients applicable to each aspheric surface in the eighth embodiment. The surface type of each aspheric surface may be defined by the formula (1) given in the above the first embodiment. Table 24 shows the effective focal lengths f1-f7 of the lenses, the total effective focal length f of the camera lens group, the total track length TTL, and the half of the diagonal length ImgH of the effective pixel area on the image plane S17 in the eighth embodiment.

TABLE 22

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | −24.6200 | 0.2700 | 1.65 | 23.5 | 99.0000 |
| S2 | aspheric | 8.2853 | 0.3800 | | | −96.2108 |
| STO | spherical | infinite | −0.3383 | | | 0.0000 |
| S3 | aspheric | 1.8212 | 0.7563 | 1.55 | 56.1 | −0.6078 |
| S4 | aspheric | −23.3133 | 0.2086 | | | 62.4925 |
| S5 | aspheric | 2.2048 | 0.2400 | 1.67 | 20.4 | −14.4489 |
| S6 | aspheric | 2.1143 | 0.3250 | | | −10.5094 |
| S7 | aspheric | −59.0430 | 0.5996 | 1.55 | 56.1 | −99.0000 |
| S8 | aspheric | −3.1408 | 0.0936 | | | 3.5591 |
| S9 | aspheric | −6.9973 | 0.2400 | 1.67 | 20.4 | 27.1971 |
| S10 | aspheric | 11.3446 | 0.1241 | | | −47.3904 |
| S11 | aspheric | 1.8966 | 0.3044 | 1.55 | 56.1 | −6.9451 |
| S12 | aspheric | 5.4880 | 0.7068 | | | 0.6082 |
| S13 | aspheric | −2.9741 | 0.2400 | 1.55 | 56.1 | −5.7289 |
| S14 | aspheric | 2.6219 | 0.1369 | | | −22.2760 |
| S15 | spherical | infinite | 0.2100 | 1.52 | 64.2 | |
| S16 | spherical | infinite | 0.2930 | | | |
| S17 | spherical | infinite | | | | |

TABLE 23

| surface number | A4 | A6 | A8 | A10 | A12 |
|---|---|---|---|---|---|
| S1 | −3.2075E−02 | 1.1887E−02 | −7.5370E−04 | −9.2715E−04 | −4.5944E−05 |
| S2 | −4.4449E−03 | 7.0168E−03 | 1.0881E−03 | −1.6549E−03 | 5.0258E−04 |
| S3 | 8.7969E−03 | 1.2603E−02 | −1.3985E−02 | 1.2437E−02 | −6.6425E−03 |
| S4 | −7.5241E−02 | 1.0103E−01 | −1.1023E−01 | 9.7711E−02 | −5.8672E−02 |
| S5 | −5.1719E−03 | −1.3316E−01 | 2.0654E−01 | −1.8325E−01 | 8.5805E−02 |
| S6 | 2.4311E−02 | −1.2724E−01 | 1.7346E−01 | −1.1609E−01 | 3.4007E−02 |
| S7 | −2.2267E−02 | −7.7193E−02 | 1.4276E−01 | −2.9830E−01 | 3.6208E−01 |
| S8 | 9.7890E−02 | −7.3982E−01 | 1.3238E+00 | −1.3378E+00 | 8.0304E−01 |
| S9 | 1.4858E−01 | −8.7666E−01 | 1.4341E+00 | −1.2381E+00 | 6.1209E−01 |
| S10 | −1.0525E−01 | −2.1709E−01 | 4.9862E−01 | −4.7279E−01 | 2.5112E−01 |
| S11 | −8.1629E−03 | −1.3010E−01 | 1.1665E−01 | −1.0541E−01 | 6.0305E−02 |
| S12 | 1.5008E−01 | −2.0645E−01 | 1.0782E−01 | −3.2978E−02 | 6.2210E−03 |
| S13 | −2.0996E−01 | 1.4372E−01 | −4.2394E−02 | 6.8024E−03 | −5.9475E−04 |
| S14 | −9.2871E−02 | 5.4360E−02 | −2.0018E−02 | 4.2808E−03 | −5.1171E−04 |

| surface number | A14 | A16 | A18 | A20 |
|---|---|---|---|---|
| S1 | 1.6676E−04 | −2.6844E−05 | −2.9520E−06 | 7.6672E−08 |
| S2 | −2.0483E−04 | 2.4593E−05 | 8.0104E−08 | −3.0692E−07 |
| S3 | 2.4902E−03 | −4.6513E−04 | 0.0000E+00 | 0.0000E+00 |
| S4 | 2.1198E−02 | −3.4876E−03 | 0.0000E+00 | 0.0000E+00 |
| S5 | −2.9896E−03 | −1.0026E−02 | 0.0000E+00 | 0.0000E+00 |
| S6 | 1.2212E−02 | −3.0230E−03 | 0.0000E+00 | 0.0000E+00 |
| S7 | −2.4260E−01 | 7.4691E−02 | 0.0000E+00 | 0.0000E+00 |
| S8 | −2.6761E−01 | 3.7634E−02 | 0.0000E+00 | 0.0000E+00 |
| S9 | −1.5897E−01 | 1.4741E−02 | 0.0000E+00 | 0.0000E+00 |
| S10 | −7.2858E−02 | 8.8010E−03 | 0.0000E+00 | 0.0000E+00 |
| S11 | −1.9935E−02 | 2.8436E−03 | 0.0000E+00 | 0.0000E+00 |
| S12 | −6.6064E−04 | 2.9425E−05 | 0.0000E+00 | 0.0000E+00 |
| S13 | 2.4635E−05 | −2.9974E−07 | 0.0000E+00 | 0.0000E+00 |
| S14 | 3.1768E−05 | −7.9339E−07 | 0.0000E+00 | 0.0000E+00 |

TABLE 24

| parameter | | | | |
|---|---|---|---|---|
| f1 (mm) | f2 (mm) | f3 (mm) | f4 (mm) | f5 (mm) |
| value | | | | |
| −9.60 | 3.13 | 1291.19 | 6.05 | −6.47 |

| parameter | | | | |
|---|---|---|---|---|
| f6 (mm) | f7 (mm) | f (mm) | TTL (mm) | ImgH (mm) |
| value | | | | |
| 5.15 | −2.51 | 3.56 | 4.79 | 3.41 |

Figure 16A:
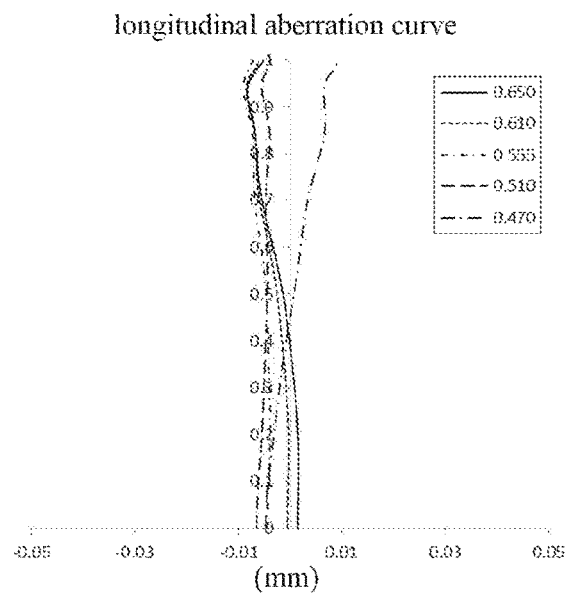
FIGS. 16A-16D respectively illustrate a longitudinal aberration curve, an astigmatic curve, a distortion curve, and a lateral color curve of the camera lens group according to the eighth embodiment.
Figure 16B:
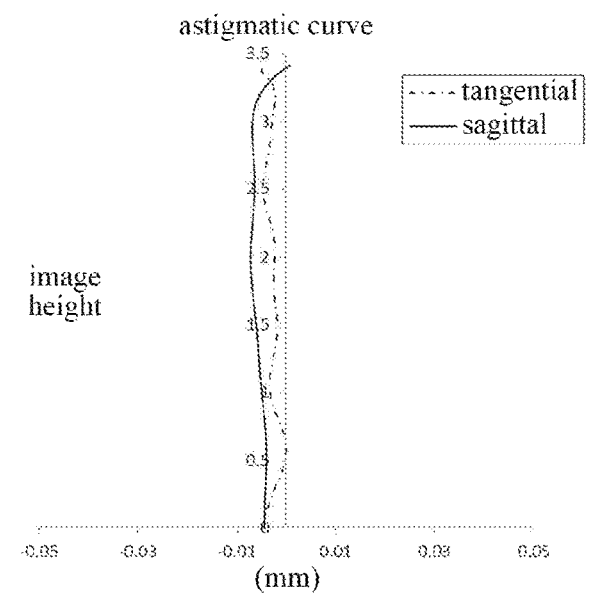
Figure 16C:
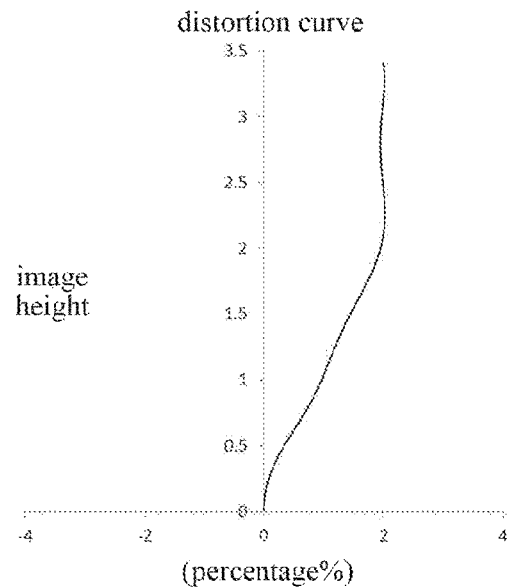
Figure 16D:
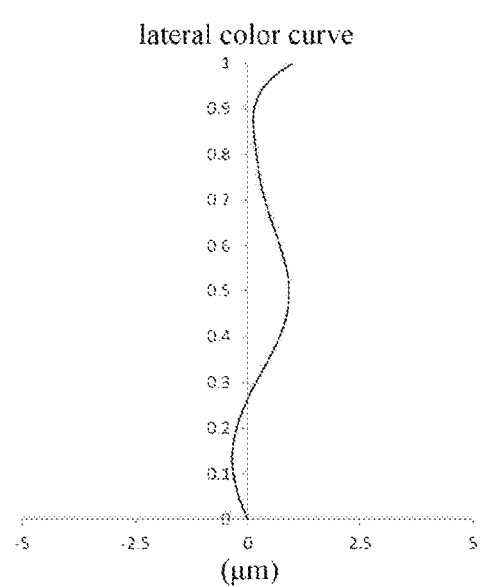

FIG. 16A shows the longitudinal aberration curve of the camera lens group according to the eighth embodiment, representing deviations of focal points of light of different wavelengths converged after passing through the lens group. FIG. 16B shows the astigmatic curve of the camera lens group according to the eighth embodiment, representing a curvature of the tangential image plane and a curvature of the sagittal image plane. FIG. 16C shows the distortion curve of the camera lens group according to the eighth embodiment, representing amounts of distortion at different viewing angles. FIG. 16D shows the lateral color curve of the camera lens group according to the eighth embodiment, representing deviations of different image heights on the image plane after light passes through the lens group. It can be seen from FIG. 16A to FIG. 16D that the camera lens group given in the eighth embodiment may achieve a good imaging quality.

Ninth Embodiment

Figure 17:
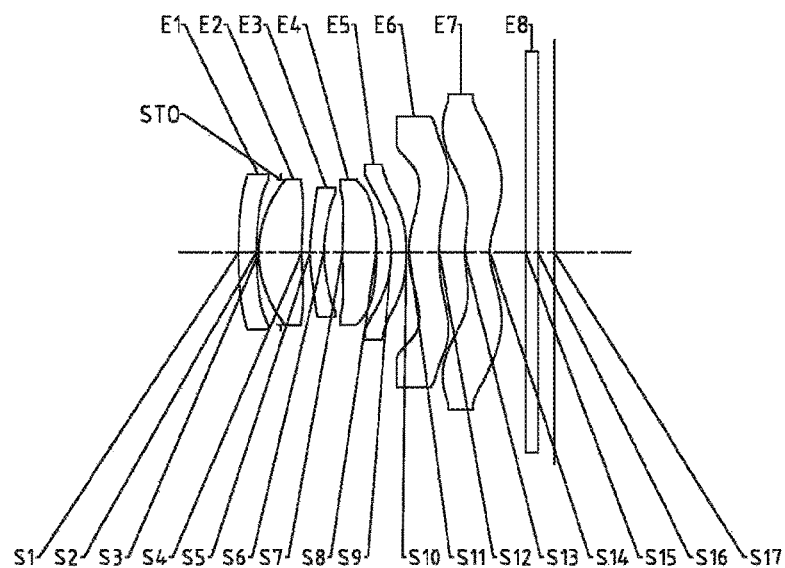
FIG. 17 is a schematic structural diagram illustrating a camera lens group according to the ninth embodiment of the present disclosure.

A camera lens group according to the ninth embodiment of the present disclosure is described below with reference to FIGS. 17-18D. FIG. 17 is a schematic structural diagram illustrating the camera lens group according to the ninth embodiment of the present disclosure.

As shown in FIG. 17, the camera lens group along an optical axis from an object side to an image side sequentially includes a first lens E1, a second lens E2, a third lens E3, a fourth lens E4, a fifth lens E5, a sixth lens E6, a seventh lens E7, and an image plane S17.

The first lens E1 has a negative refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a convex surface, an image-side surface S14 of the seventh lens E7 is a concave surface, and the object-side surface S13 and the image-side surface S14 of the seventh lens E7 are both aspheric surfaces.

Optionally, the camera lens group may further include an optical filter E8 having an object-side surface S15 and an image-side surface S16. Light from an object passes through the surfaces S1 to S16 sequentially and is finally imaged on the image plane S17.

Optionally, the camera lens group may further include a diaphragm STO disposed between the first lens E1 and the second lens E2, to improve the imaging quality.

Table 25 shows the surface type, the radius of curvature, the thickness, the material, and the conic coefficient of each lens of the camera lens group in the ninth embodiment. The radius of curvature and the thickness are shown in millimeters (mm). Table 26 shows the high-order coefficients applicable to each aspheric surface in the ninth embodiment. The surface type of each aspheric surface may be defined by the formula (1) given in the above the first embodiment. Table 27 shows the effective focal lengths f1-f7 of the lenses, the total effective focal length f of the camera lens group, the total track length TTL, and the half of the diagonal length ImgH of the effective pixel area on the image plane S17 in the ninth embodiment.

TABLE 25

| surface number | surface type | radius of curvature | thickness | material refractive index | abbe number | conic coefficient |
|---|---|---|---|---|---|---|
| OBJ | spherical | infinite | infinite | | | |
| S1 | aspheric | 7.9871 | 0.3000 | 1.65 | 23.5 | 24.5797 |
| S2 | aspheric | 6.4828 | 0.4100 | | | 20.3330 |
| STO | spherical | infinite | −0.3683 | | | 0.0000 |
| S3 | aspheric | 1.9157 | 0.7189 | 1.55 | 56.1 | −1.2128 |
| S4 | aspheric | 5.9267 | 0.1389 | | | −19.9098 |
| S5 | aspheric | 2.6209 | 0.2300 | 1.67 | 20.4 | −25.1392 |
| S6 | aspheric | 2.2593 | 0.3146 | | | −7.9992 |
| S7 | aspheric | 12.0350 | 0.5609 | 1.55 | 56.1 | 99.0000 |
| S8 | aspheric | −6.7623 | 0.2644 | | | 5.1445 |
| S9 | aspheric | −1.8124 | 0.2475 | 1.67 | 20.4 | −4.8820 |
| S10 | aspheric | −3.9494 | 0.0499 | | | −2.0571 |
| S11 | aspheric | 1.7261 | 0.5094 | 1.55 | 56.1 | −3.5385 |
| S12 | aspheric | 6.0999 | 0.4236 | | | −26.4775 |
| S13 | aspheric | 1.9770 | 0.4197 | 1.55 | 56.1 | −1.7671 |
| S14 | aspheric | 1.1331 | 0.5980 | | | −4.1185 |
| S15 | spherical | infinite | 0.2100 | 1.52 | 64.2 | |
| S16 | spherical | infinite | 0.2723 | | | |
| S17 | spherical | infinite | | | | |

TABLE 26

| surface number | A4 | A6 | A8 | A10 | A12 |
|---|---|---|---|---|---|
| S1 | −2.9430E−03 | 4.8731E−03 | 4.7723E−04 | −5.8999E−04 | −2.2151E−04 |
| S2 | 9.1415E−03 | 4.8405E−03 | 1.9634E−03 | 3.4552E−04 | −6.0486E−04 |
| S3 | 2.3866E−02 | 2.6617E−02 | −7.6912E−02 | 1.1783E−01 | −1.0113E−01 |
| S4 | −9.1535E−02 | 3.7055E−02 | 8.8365E−03 | −4.5182E−02 | 4.0015E−02 |
| S5 | 2.1009E−03 | −1.6894E−01 | 3.0628E−01 | −2.2977E−01 | 4.5764E−02 |
| S6 | −1.2360E−02 | 5.7725E−04 | −2.3519E−03 | 1.6845E−01 | −3.0129E−01 |
| S7 | −5.0795E−02 | 5.6281E−02 | −2.3927E−01 | 3.8641E−01 | −3.4509E−01 |
| S8 | −6.6719E−02 | 6.3627E−02 | −2.0063E−01 | 2.3674E−01 | −1.8255E−01 |
| S9 | −9.2203E−02 | 1.1981E−01 | −3.1369E−01 | 3.3379E−01 | −1.2809E−01 |
| S10 | −2.2546E−01 | 2.2083E−01 | −2.2668E−01 | 1.6217E−01 | −3.4753E−02 |
| S11 | −8.2500E−02 | 6.8370E−02 | −1.2959E−01 | 1.1020E−01 | −5.1348E−02 |
| S12 | 1.8050E−01 | −2.2247E−01 | 1.2603E−01 | −4.4165E−02 | 9.2725E−03 |
| S13 | −3.5788E−01 | 1.6079E−01 | −4.2788E−02 | 8.3170E−03 | −1.1415E−03 |
| S14 | −1.8099E−01 | 9.0634E−02 | −3.3558E−02 | 8.2617E−03 | −1.2172E−03 |

| surface number | A14 | A16 | A18 | A20 |
|---|---|---|---|---|
| S1 | 9.8701E−05 | −2.5728E−05 | −2.9503E−06 | 7.6610E−08 |
| S2 | −2.0480E−04 | 2.4589E−05 | 8.0134E−08 | −3.0700E−07 |
| S3 | 4.4653E−02 | −8.1607E−03 | 0.0000E+00 | 0.0000E+00 |
| S4 | −1.3994E−02 | 1.2590E−03 | 0.0000E+00 | 0.0000E+00 |
| S5 | 4.5449E−02 | −2.1601E−02 | 0.0000E+00 | 0.0000E+00 |
| S6 | 2.2182E−01 | −5.6696E−02 | 0.0000E+00 | 0.0000E+00 |
| S7 | 1.2645E−01 | −6.4432E−03 | 0.0000E+00 | 0.0000E+00 |
| S8 | 8.6373E−02 | −1.7758E−02 | 0.0000E+00 | 0.0000E+00 |
| S9 | 1.0979E−02 | 1.1917E−03 | 0.0000E+00 | 0.0000E+00 |
| S10 | −9.7522E−03 | 3.5122E−03 | 0.0000E+00 | 0.0000E+00 |
| S11 | 1.2139E−02 | −1.1090E−03 | 0.0000E+00 | 0.0000E+00 |
| S12 | −1.0378E−03 | 4.7008E−05 | 0.0000E+00 | 0.0000E+00 |
| S13 | 9.3818E−05 | −3.3415E−06 | 0.0000E+00 | 0.0000E+00 |
| S14 | 9.5581E−05 | −3.0317E−06 | 0.0000E+00 | 0.0000E+00 |

TABLE 27

| parameter | | | | |
|---|---|---|---|---|
| f1 (mm) | f2 (mm) | f3 (mm) | f4 (mm) | f5 (mm) |
| value −58.02 | 4.88 | −32.98 | 8.01 | −5.45 |

| parameter | | | | |
|---|---|---|---|---|
| f6 (mm) | f7 (mm) | f (mm) | TTL (mm) | ImgH (mm) |
| value 4.24 | −5.90 | 3.92 | 5.30 | 3.41 |

Figures 18A, 18B:
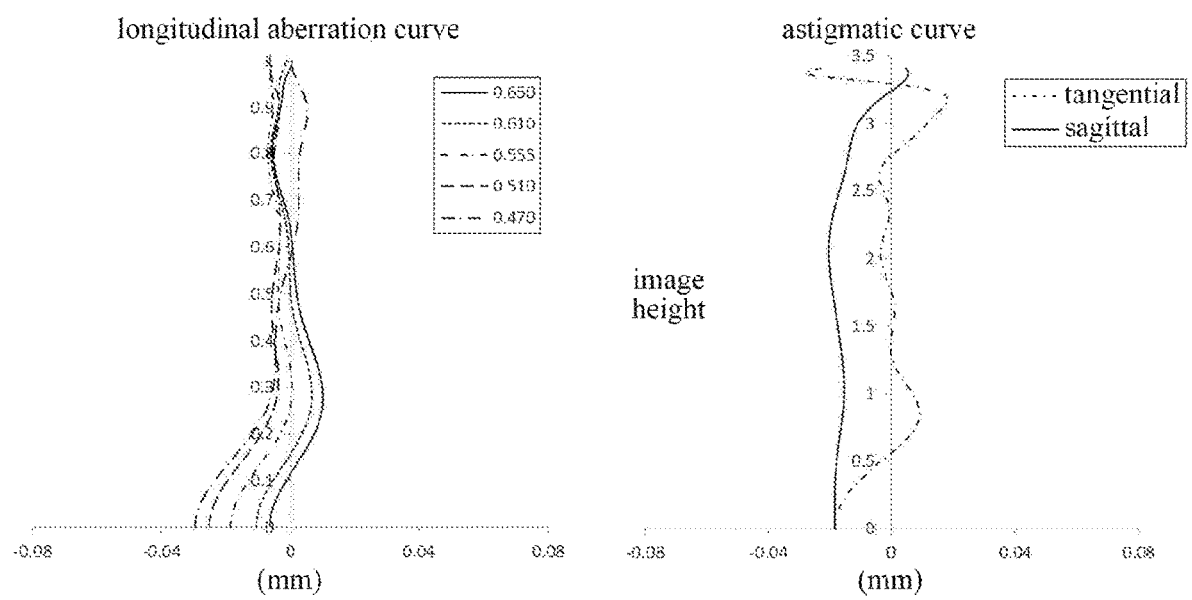

FIG. 18A shows the longitudinal aberration curve of the camera lens group according to the ninth embodiment, representing deviations of focal points of light of different wavelengths converged after passing through the lens group. FIG. 18B shows the astigmatic curve of the camera lens group according to the ninth embodiment, representing a curvature of the tangential image plane and a curvature of the sagittal image plane. FIG. 18C shows the distortion curve of the camera lens group according to the ninth embodiment, representing amounts of distortion at different viewing angles. FIG. 18D shows the lateral color curve of the camera lens group according to the ninth embodiment, representing deviations of different image heights on the image plane after light passes through the lens group. It can be seen from FIG. 18A to FIG. 18D that the camera lens group given in the ninth embodiment may achieve a good imaging quality.

Tenth Embodiment

A camera lens group according to the tenth embodiment of the present disclosure is described below with reference to FIGS. 19-20D. FIG. 19 is a schematic structural diagram illustrating the camera lens group according to the tenth embodiment of the present disclosure.

As shown in FIG. 19, the camera lens group along an optical axis from an object side to an image side sequentially includes a first lens E1, a second lens E2, a third lens E3, a fourth lens E4, a fifth lens E5, a sixth lens E6, a seventh lens E7, and an image plane S17.

The first lens E1 has a negative refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a convex surface, an image-side surface S14 of the seventh lens E7 is a concave surface, and the object-side surface S13 and the image-side surface S14 of the seventh lens E7 are both aspheric surfaces.

Optionally, the camera lens group may further include an optical filter E8 having an object-side surface S15 and an image-side surface S16. Light from an object passes through the surfaces S1 to S16 sequentially and is finally imaged on the image plane S17.

Optionally, the camera lens group may further include a diaphragm STO disposed between the first lens E1 and the second lens E2, to improve the imaging quality.

Table 28 shows the surface type, the radius of curvature, the thickness, the material, and the conic coefficient of each lens of the camera lens group in the tenth embodiment. The radius of curvature and the thickness are shown in millimeters (mm). Table 29 shows the high-order coefficients applicable to each aspheric surface in the tenth embodiment. The surface type of each aspheric surface may be defined by the formula (1) given in the above the first embodiment. Table 30 shows the effective focal lengths f1-f7 of the lenses, the total effective focal length f of the camera lens group, the total track length TTL, and the half of the diagonal length ImgH of the effective pixel area on the image plane S17 in the tenth embodiment.

TABLE 28

| surface number | surface type | radius of curvature | thickness | material refractive index | abbe number | conic coefficient |
|---|---|---|---|---|---|---|
| OBJ | spherical | infinite | infinite | | | |
| S1 | aspheric | 8.0652 | 0.3000 | 1.65 | 23.5 | 25.1133 |
| S2 | aspheric | 6.4674 | 0.3800 | | | 20.3713 |
| STO | spherical | infinite | −0.3383 | | | 0.0000 |
| S3 | aspheric | 1.9305 | 0.7138 | 1.55 | 56.1 | −1.2347 |
| S4 | aspheric | 5.8068 | 0.1466 | | | −21.3432 |
| S5 | aspheric | 2.5743 | 0.2300 | 1.67 | 20.4 | −24.3207 |
| S6 | aspheric | 2.2697 | 0.3013 | | | −8.2335 |
| S7 | aspheric | 11.6976 | 0.5606 | 1.55 | 56.1 | 99.0000 |
| S8 | aspheric | −6.3832 | 0.2633 | | | 5.2452 |
| S9 | aspheric | −1.7887 | 0.2378 | 1.67 | 20.4 | −4.7993 |
| S10 | aspheric | −4.0016 | 0.0499 | | | −2.0405 |
| S11 | aspheric | 1.7028 | 0.4964 | 1.55 | 56.1 | −3.5502 |
| S12 | aspheric | 5.6676 | 0.4355 | | | −24.3027 |
| S13 | aspheric | 1.9534 | 0.4217 | 1.55 | 56.1 | −1.7336 |
| S14 | aspheric | 1.1242 | 0.5991 | | | −4.0248 |
| S15 | spherical | infinite | 0.2100 | 1.52 | 64.2 | |
| S16 | spherical | infinite | 0.2723 | | | |
| S17 | spherical | infinite | | | | |

TABLE 29

| surface number | A4 | A6 | A8 | A10 | A12 |
|---|---|---|---|---|---|
| S1 | −3.6392E−03 | 5.1950E−03 | 4.7325E−04 | −6.4256E−04 | −2.4419E−04 |
| S2 | 9.6232E−03 | 5.2081E−03 | 2.0816E−03 | 3.4628E−04 | −6.5692E−04 |
| S3 | 2.4549E−02 | 2.3889E−02 | −7.2442E−02 | 1.1397E−01 | −1.0088E−01 |
| S4 | −8.8411E−02 | 2.5235E−02 | 2.4680E−02 | −5.9640E−02 | 4.9409E−02 |
| S5 | 9.4505E−03 | −1.8066E−01 | 2.9330E−01 | −1.7284E−01 | −2.2519E−02 |
| S6 | −9.6145E−03 | −6.2935E−03 | −4.6611E−03 | 1.7531E−01 | −2.8955E−01 |
| S7 | −4.65536E−02 | 2.9916E−02 | −1.5089E−01 | 2.1143E−01 | −1.4341E−01 |
| S8 | −6.2656E−02 | 4.5185E−02 | −1.6949E−01 | 2.1339E−01 | −1.7668E−01 |
| S9 | −8.6219E−02 | 7.4854E−02 | −2.2713E−01 | 2.5267E−01 | −8.5941E−02 |
| S10 | −2.3098E−01 | 2.1440E−01 | −1.9434E−01 | 1.1898E−01 | −4.2139E−03 |
| S11 | −9.4741E−02 | 9.1845E−02 | −1.5391E−01 | 1.2456E−01 | −5.6962E−02 |
| S12 | 1.7378E−01 | −2.1136E−01 | 1.1777E−01 | −4.0945E−02 | 8.6030E−03 |
| S13 | −3.6835E−01 | 1.6901E−01 | −4.6267E−02 | 9.3161E−03 | −1.3262E−03 |
| S14 | −1.8750E−01 | 9.7385E−02 | −3.7184E−02 | 9.2920E−03 | −1.3756E−03 |

| surface number | A14 | A16 | A18 | A20 |
|---|---|---|---|---|
| S1 | 1.0832E−04 | −2.5728E−05 | −2.9503E−06 | 7.6610E−08 |
| S2 | −2.0480E−04 | 2.4589E−05 | 8.0134E−08 | −3.0700E−07 |
| S3 | 4.6033E−02 | −8.6866E−03 | 0.0000E+00 | 0.0000E+00 |
| S4 | −1.7482E−02 | 1.7391E−03 | 0.0000E+00 | 0.0000E+00 |
| S5 | 8.3945E−02 | −3.0374E−02 | 0.0000E+00 | 0.0000E+00 |
| S6 | 1.9864E−01 | −4.6669E−02 | 0.0000E+00 | 0.0000E+00 |
| S7 | −5.1781E−04 | 2.6741E−02 | 0.0000E+00 | 0.0000E+00 |
| S8 | 8.7850E−02 | −1.8544E−02 | 0.0000E+00 | 0.0000E+00 |
| S9 | −1.0534E−04 | 2.1265E−03 | 0.0000E+00 | 0.0000E+00 |
| S10 | −2.1037E−02 | 5.1883E−03 | 0.0000E+00 | 0.0000E+00 |
| S11 | 1.3468E−02 | −1.2421E−03 | 0.0000E+00 | 0.0000E+00 |
| S12 | −9.6678E−04 | 4.3910E−05 | 0.0000E+00 | 0.0000E+00 |
| S13 | 1.1277E−04 | −4.1482E−06 | 0.0000E+00 | 0.0000E+00 |
| S14 | 1.0818E−04 | −3.4371E−06 | 0.0000E+00 | 0.0000E+00 |

TABLE 30

| parameter | | | | |
|---|---|---|---|---|
| f1 (mm) | f2 (mm) | f3 (mm) | f4 (mm) | f5 (mm) |
| value −54.76 | 4.97 | −41.27 | 7.65 | −5.25 |

| parameter | | | | |
|---|---|---|---|---|
| f6 (mm) | f7 (mm) | f (mm) | TTL (mm) | ImgH (mm) |
| value 4.27 | −5.91 | 3.92 | 5.28 | 3.41 |

Figure 20A:
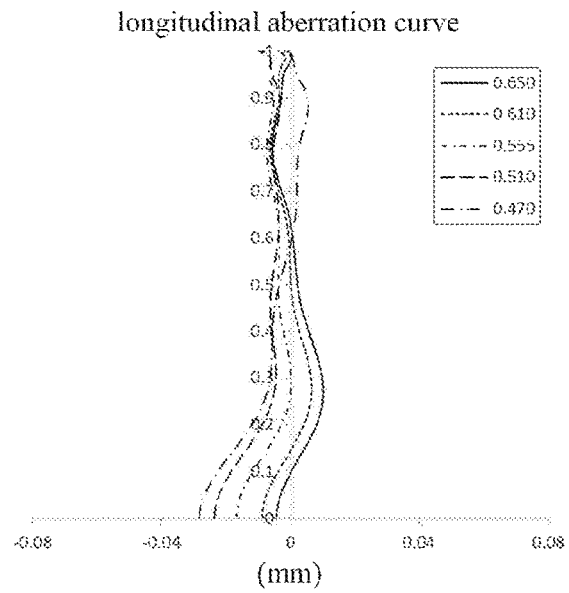
FIGS. 20A-20D respectively illustrate a longitudinal aberration curve, an astigmatic curve, a distortion curve, and a lateral color curve of the camera lens group according to the tenth embodiment.
Figure 20B:
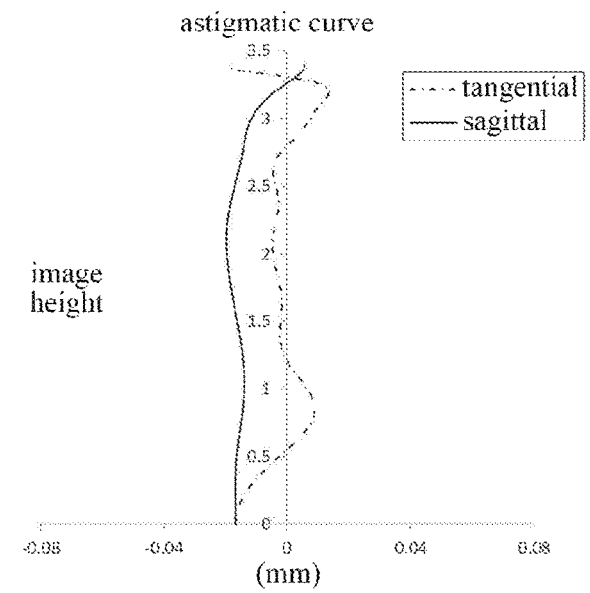
Figure 20C:
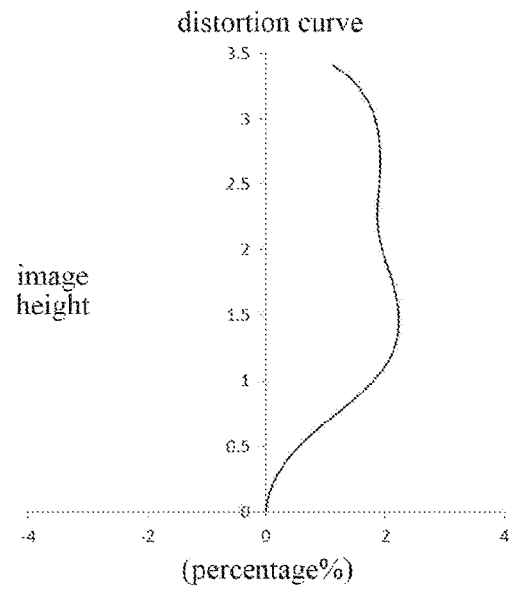
Figure 20D:
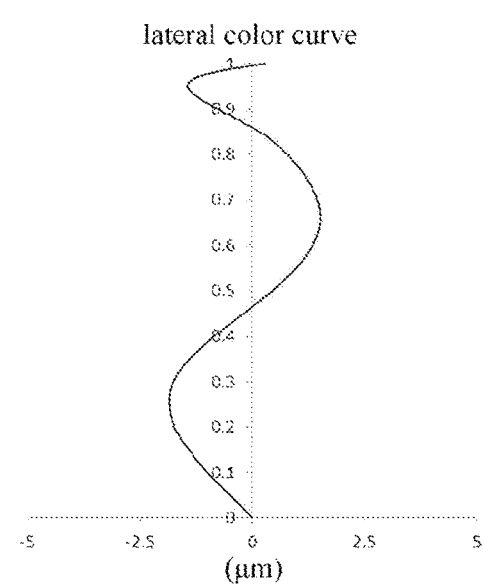

FIG. 20A shows the longitudinal aberration curve of the camera lens group according to the tenth embodiment, representing deviations of focal points of light of different wavelengths converged after passing through the lens group. FIG. 20B shows the astigmatic curve of the camera lens group according to the tenth embodiment, representing a curvature of the tangential image plane and a curvature of the sagittal image plane. FIG. 20C shows the distortion curve of the camera lens group according to the tenth embodiment, representing amounts of distortion at different viewing angles. FIG. 20D shows the lateral color curve of the camera lens group according to the tenth embodiment, representing deviations of different image heights on the image plane after light passes through the lens group. It can be seen from FIG. 20A to FIG. 20D that the camera lens group given in the tenth embodiment may achieve a good imaging quality.

Eleventh Embodiment

A camera lens group according to the eleventh embodiment of the present disclosure is described below with reference to FIGS. 21-22D. FIG. 21 is a schematic structural diagram illustrating the camera lens group according to the eleventh embodiment of the present disclosure.

As shown in FIG. 21, the camera lens group along an optical axis from an object side to an image side sequentially includes a first lens E1, a second lens E2, a third lens E3, a fourth lens E4, a fifth lens E5, a sixth lens E6, a seventh lens E7, and an image plane S17.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a convex surface, an image-side surface S14 of the seventh lens E7 is a concave surface, and the object-side surface S13 and the image-side surface S14 of the seventh lens E7 are both aspheric surfaces.

Optionally, the camera lens group may further include an optical filter E8 having an object-side surface S15 and an image-side surface S16. Light from an object passes through the surfaces S1 to S16 sequentially and is finally imaged on the image plane S17.

Optionally, the camera lens group may further include a diaphragm STO disposed between the first lens E1 and the second lens E2, to improve the imaging quality.

Table 31 shows the surface type, the radius of curvature, the thickness, the material, and the conic coefficient of each lens of the camera lens group in the eleventh embodiment. The radius of curvature and the thickness are shown in millimeters (mm). Table 32 shows the high-order coefficients applicable to each aspheric surface in the eleventh embodiment. The surface type of each aspheric surface may be defined by the formula (1) given in the above the first embodiment. Table 33 shows the effective focal lengths f1-f7 of the lenses, the total effective focal length f of the camera lens group, the total track length TTL, and the half of the diagonal length ImgH of the effective pixel area on the image plane S17 in the eleventh embodiment.

TABLE 31

| surface number | surface type | radius of curvature | thickness | material refractive index | abbe number | conic coefficient |
|---|---|---|---|---|---|---|
| OBJ | spherical | infinite | infinite | | | |
| S1 | aspheric | 7.2098 | 0.2905 | 1.65 | 23.5 | 17.0752 |
| S2 | aspheric | 7.2100 | 0.3708 | | | 24.2724 |
| STO | spherical | infinite | −0.3185 | | | 0.0000 |
| S3 | aspheric | 1.6427 | 0.5867 | 1.55 | 56.1 | −1.8568 |
| S4 | aspheric | 6.5073 | 0.0563 | | | −52.7742 |
| S5 | aspheric | 3.9196 | 0.2369 | 1.67 | 20.4 | −61.0801 |
| S6 | aspheric | 2.5030 | 0.3110 | | | −17.5488 |
| S7 | aspheric | 22.9657 | 0.5067 | 1.55 | 56.1 | −99.0000 |
| S8 | aspheric | −5.4329 | 0.3519 | | | −79.4407 |
| S9 | aspheric | −1.2395 | 0.3090 | 1.65 | 23.5 | −4.4636 |
| S10 | aspheric | −1.4978 | 0.0514 | | | −15.0708 |
| S11 | aspheric | 2.6787 | 0.5792 | 1.55 | 56.1 | −5.2259 |
| S12 | aspheric | 7.2750 | 0.3155 | | | −99.0000 |
| S13 | aspheric | 9.2007 | 0.5001 | 1.54 | 55.7 | 5.8106 |
| S14 | aspheric | 1.8418 | 0.4185 | | | −7.2449 |
| S15 | spherical | infinite | 0.2100 | 1.52 | 64.2 | |
| S16 | spherical | infinite | 0.3520 | | | |
| S17 | spherical | infinite | | | | |

TABLE 32

| surface number | A4 | A6 | A8 | A10 | A12 |
|---|---|---|---|---|---|
| S1 | −1.6915E−02 | 3.6936E−02 | −1.2068E−01 | 2.4610E−01 | −2.9484E−01 |
| S2 | −1.8425E−02 | 3.7553E−03 | 4.0685E−02 | −1.3182E−01 | 2.5912E−01 |
| S3 | 4.3466E−02 | 5.2688E−02 | −1.5797E−01 | 2.9485E−01 | −3.1370E−01 |
| S4 | −1.5919E−01 | 2.9724E−01 | −3.8886E−01 | 3.1970E−01 | −1.5715E−01 |
| S5 | −1.3583E−01 | 2.4246E−01 | −1.6771E−01 | 4.5916E−02 | 4.6036E−03 |
| S6 | 2.1512E−02 | 5.5248E−02 | 4.6733E−02 | −1.0365E−01 | 7.1918E−02 |
| S7 | −9.7744E−02 | 3.2792E−01 | −2.3197E+00 | 8.9558E+00 | −2.1551E+01 |
| S8 | −9.1730E−02 | 4.2725E−02 | −6.4751E−02 | −2.3661E−01 | 9.2663E−01 |
| S9 | 2.8761E−02 | −6.1240E−02 | −1.4484E−01 | 5.3038E−01 | −6.8545E−01 |
| S10 | −3.4005E−01 | 7.8424E−01 | −1.6066E+00 | 2.3694E+00 | −2.3015E+00 |
| S11 | −4.4351E−02 | −9.8918E−02 | 1.9405E−01 | −2.5671E−01 | 2.1881E−01 |
| S12 | 2.6762E−02 | −5.1640E−02 | 8.6576E−03 | 1.3027E−02 | −1.0455E−02 |
| S13 | −2.1085E−01 | 7.1309E−02 | 5.8278E−05 | −6.4386E−03 | 2.0739E−03 |
| S14 | −1.1454E−01 | 4.5748E−02 | −1.2034E−02 | 1.9740E−03 | −2.2563E−04 |

| surface number | A14 | A16 | A18 | A20 |
|---|---|---|---|---|
| S1 | 2.1805E−01 | −9.8547E−02 | 2.4963E−02 | −2.7126E−03 |
| S2 | −2.8808E−01 | 1.7742E−01 | −5.6581E−02 | 7.2857E−03 |
| S3 | 1.7894E−01 | −4.5987E−02 | 0.0000E+00 | 0.0000E+00 |
| S4 | 3.1037E−02 | 0.0000E+00 | 0.0000E+00 | 0.0000E+00 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | 3.2555E+01 | −3.0087E+01 | 1.5574E+01 | −3.4517E+00 |
| S8 | −1.5172E+00 | 1.3545E+00 | −6.3322E−01 | 1.2235E−01 |
| S9 | 4.1824E−01 | −7.2475E−02 | −3.6721E−02 | 1.3004E−02 |
| S10 | 1.4473E+00 | −5.6385E−01 | 1.2274E−01 | −1.1349E−02 |
| S11 | −1.1788E−01 | 3.7573E−02 | −6.3398E−03 | 4.3285E−04 |
| S12 | 3.5020E−03 | −5.9960E−04 | 5.0824E−05 | −1.6634E−06 |
| S13 | −3.2820E−04 | 2.8401E−05 | −1.2333E−06 | 1.8971E−08 |
| S14 | 3.1333E−05 | −5.5591E−06 | 5.9186E−07 | −2.3966E−08 |

TABLE 33

| | parameter | | | | |
|---|---|---|---|---|---|
| | f1 (mm) | f2 (mm) | f3 (mm) | f4 (mm) | f5 (mm) |
| value | 709.06 | 3.86 | −11.15 | 8.10 | −21.01 |

| | parameter | | | |
|---|---|---|---|---|
| | f6 (mm) | f7 (mm) | f (mm) | TTL (mm) | ImgH (mm) |
| value | 7.44 | −4.40 | 3.85 | 5.13 | 3.34 |

Figures 22C, 22D:
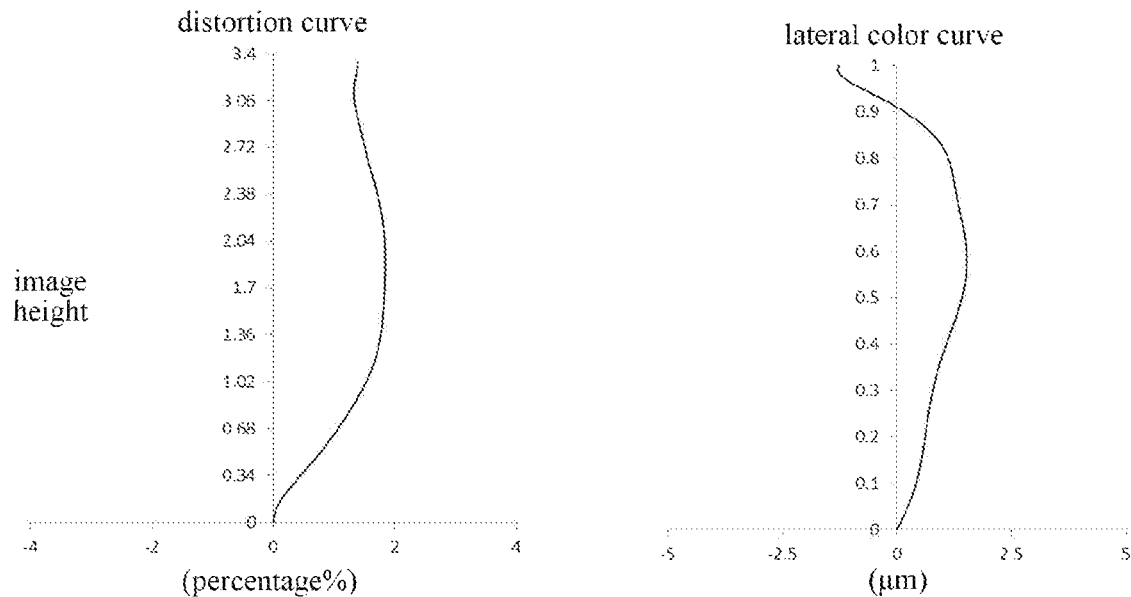

FIG. 22A shows the longitudinal aberration curve of the camera lens group according to the eleventh embodiment, representing deviations of focal points of light of different wavelengths converged after passing through the lens group. FIG. 22B shows the astigmatic curve of the camera lens group according to the eleventh embodiment, representing a curvature of the tangential image plane and a curvature of the sagittal image plane. FIG. 22C shows the distortion curve of the camera lens group according to the eleventh embodiment, representing amounts of distortion at different viewing angles. FIG. 22D shows the lateral color curve of the camera lens group according to the eleventh embodiment, representing deviations of different image heights on the image plane after light passes through the lens group. It can be seen from FIG. 22A to FIG. 22D that the camera lens group given in the eleventh embodiment may achieve a good imaging quality.

Twelfth Embodiment

Figure 23:
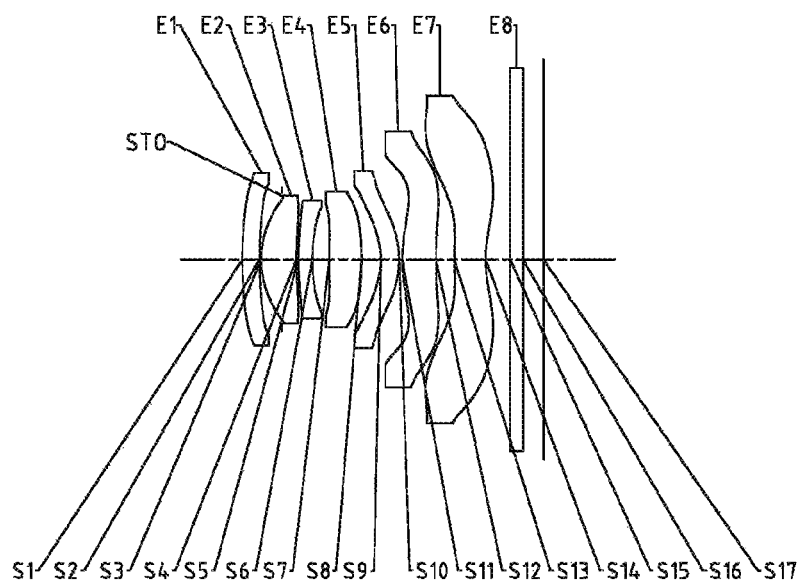
FIG. 23 is a schematic structural diagram illustrating a camera lens group according to the twelfth embodiment of the present disclosure.

A camera lens group according to the twelfth embodiment of the present disclosure is described below with reference to FIGS. 23-24D. FIG. 23 is a schematic structural diagram illustrating the camera lens group according to the twelfth embodiment of the present disclosure.

As shown in FIG. 23, the camera lens group along an optical axis from an object side to an image side sequentially includes a first lens E1, a second lens E2, a third lens E3, a fourth lens E4, a fifth lens E5, a sixth lens E6, a seventh lens E7, and an image plane S17.

The first lens E1 has a positive refractive power, an object-side surface S1 of the first lens E1 is a convex surface, an image-side surface S2 of the first lens E1 is a concave surface, and the object-side surface S1 and the image-side surface S2 of the first lens E1 are both aspheric surfaces.

The second lens E2 has a positive refractive power, an object-side surface S3 of the second lens E2 is a convex surface, an image-side surface S4 of the second lens E2 is a concave surface, and the object-side surface S3 and the image-side surface S4 of the second lens E2 are both aspheric surfaces.

The third lens E3 has a negative refractive power, an object-side surface S5 of the third lens E3 is a convex surface, an image-side surface S6 of the third lens E3 is a concave surface, and the object-side surface S5 and the image-side surface S6 of the third lens E3 are both aspheric surfaces.

The fourth lens E4 has a positive refractive power, an object-side surface S7 of the fourth lens E4 is a convex surface, an image-side surface S8 of the fourth lens E4 is a convex surface, and the object-side surface S7 and the image-side surface S8 of the fourth lens E4 are both aspheric surfaces.

The fifth lens E5 has a negative refractive power, an object-side surface S9 of the fifth lens E5 is a concave surface, an image-side surface S10 of the fifth lens E5 is a convex surface, and the object-side surface S9 and the image-side surface S10 of the fifth lens E5 are both aspheric surfaces.

The sixth lens E6 has a positive refractive power, an object-side surface S11 of the sixth lens E6 is a convex surface, an image-side surface S12 of the sixth lens E6 is a concave surface, and the object-side surface S11 and the image-side surface S12 of the sixth lens E6 are both aspheric surfaces.

The seventh lens E7 has a negative refractive power, an object-side surface S13 of the seventh lens E7 is a convex surface, an image-side surface S14 of the seventh lens E7 is a concave surface, and the object-side surface S13 and the image-side surface S14 of the seventh lens E7 are both aspheric surfaces.

Optionally, the camera lens group may further include an optical filter E8 having an object-side surface S15 and an image-side surface S16. Light from an object passes through the surfaces S1 to S16 sequentially and is finally imaged on the image plane S17.

Optionally, the camera lens group may further include a diaphragm STO disposed between the first lens E1 and the second lens E2, to improve the imaging quality.

Table 34 shows the surface type, the radius of curvature, the thickness, the material, and the conic coefficient of each lens of the camera lens group in the twelfth embodiment. The radius of curvature and the thickness are shown in millimeters (mm). Table 35 shows the high-order coefficients applicable to each aspheric surface in the twelfth embodiment. The surface type of each aspheric surface may be defined by the formula (1) given in the above the first embodiment. Table 36 shows the effective focal lengths f1-f7 of the lenses, the total effective focal length f of the camera lens group, the total track length TTL, and the half of the diagonal length ImgH of the effective pixel area on the image plane S17 in the twelfth embodiment.

TABLE 34

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 6.8439 | 0.2820 | 1.65 | 23.5 | 17.6127 |
| S2 | aspheric | 6.9335 | 0.3700 | | | 23.4866 |
| STO | spherical | infinite | −0.3392 | | | 0.0000 |
| S3 | aspheric | 1.5926 | 0.5772 | 1.55 | 56.1 | −1.9398 |
| S4 | aspheric | 4.2140 | 0.0298 | | | −46.6246 |
| S5 | aspheric | 3.2926 | 0.2300 | 1.67 | 20.4 | −56.2910 |
| S6 | aspheric | 2.4951 | 0.2808 | | | −17.7396 |
| S7 | aspheric | 17.4146 | 0.5281 | 1.55 | 56.1 | −95.5546 |
| S8 | aspheric | −5.1989 | 0.3204 | | | −79.1508 |
| S9 | aspheric | −1.1679 | 0.3017 | 1.65 | 23.5 | −4.4786 |
| S10 | aspheric | −1.3721 | 0.0499 | | | −14.6748 |
| S11 | aspheric | 2.4179 | 0.5536 | 1.55 | 56.1 | −4.9138 |
| S12 | aspheric | 5.6340 | 0.3042 | | | −99.0000 |
| S13 | aspheric | 8.7232 | 0.5129 | 1.54 | 55.7 | 5.7410 |
| S14 | aspheric | 1.8924 | 0.4039 | | | −6.7504 |
| S15 | spherical | infinite | 0.2100 | 1.52 | 64.2 | |
| S16 | spherical | infinite | 0.3373 | | | |
| S17 | spherical | infinite | | | | |

TABLE 35

| surface number | A4 | A6 | A8 | A10 | A12 |
|---|---|---|---|---|---|
| S1 | −1.9592E−02 | 6.2773E−02 | −2.2113E−01 | 4.4693E−01 | −5.3082E−01 |
| S2 | −1.7744E−02 | 9.2119E−04 | −7.7150E−02 | 3.2820E−01 | −5.7678E−01 |
| S3 | 4.9660E−02 | 7.5843E−02 | −3.1599E−01 | 6.4292E−01 | −6.8663E−01 |
| S4 | −1.6608E−01 | 2.9835E−01 | −3.6178E−01 | 3.0693E−01 | −1.9112E−01 |
| S5 | −1.2368E−01 | 1.4887E−01 | 6.2024E−01 | −1.7567E−01 | 8.3709E−02 |
| S6 | 3.7495E−02 | −9.4062E−04 | 1.7725E−01 | −2.5762E−01 | 1.4809E−01 |
| S7 | −1.5576E−01 | 1.1777E+00 | −8.9196E+00 | 3.8276E+01 | −1.0154E+02 |
| S8 | −6.8751E−02 | −2.3699E−01 | 1.4716E+00 | −5.3923E+00 | 1.1328E+01 |
| S9 | 6.9254E−02 | −2.9567E−01 | 6.1834E−01 | −1.2087E+00 | 1.8191E+00 |
| S10 | −3.7390E−01 | 8.3669E−01 | −1.5812E+00 | 2.1070E+00 | −1.8515E+00 |
| S11 | −4.2604E−02 | −1.1600E−01 | 2.5030E−01 | −3.4099E−01 | 2.8877E−01 |
| S12 | 1.9437E−02 | −4.4310E−02 | 1.5459E−03 | 1.6830E−02 | −1.1931E−02 |
| S13 | −2.2986E−01 | 8.1815E−02 | 7.4744E−04 | −8.7918E−03 | 3.0353E−03 |
| S14 | −1.2587E−01 | 5.5079E−02 | −1.6207E−02 | 3.1681E−03 | −4.0846E−04 |

| surface number | A14 | A16 | A18 | A20 |
|---|---|---|---|---|
| S1 | 3.8953E−01 | −1.7417E−01 | 4.3418E−02 | −4.6108E−03 |
| S2 | 5.8333E−01 | −3.5226E−01 | 1.1685E−01 | −1.6173E−02 |
| S3 | 3.7516E−01 | −8.8289E−02 | 0.0000E+00 | 0.0000E+00 |
| S4 | 5.3281E−02 | 0.0000E+00 | 0.0000E+00 | 0.0000E+00 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | 1.6793E+02 | −1.6842E+02 | 9.3604E+01 | −2.2056E+01 |
| S8 | −1.4461E+01 | 1.1132E+01 | −4.7504E+00 | 8.6540E−01 |
| S9 | −1.7653E+00 | 1.0645E+00 | −3.6986E−01 | 5.5977E−02 |
| S10 | 1.0933E+00 | −4.2219E−01 | 9.5287E−02 | −9.3901E−03 |
| S11 | −1.5284E−01 | 4.8125E−02 | −8.1116E−03 | 5.5944E−04 |
| S12 | 3.8657E−03 | −6.3143E−04 | 4.7531E−05 | −1.1123E−06 |
| S13 | −5.2695E−04 | 5.1591E−05 | −2.6853E−06 | 5.6904E−08 |
| S14 | 3.5890E−05 | −3.1434E−06 | 3.0364E−07 | −1.4249E−08 |

TABLE 36

| parameter | f1 (mm) | f2 (mm) | f3 (mm) | f4 (mm) | f5 (mm) |
|---|---|---|---|---|---|
| value | 368.78 | 4.35 | −17.49 | 7.39 | −28.92 |

| parameter | f6 (mm) | f7 (mm) | f (mm) | TTL (mm) | ImgH (mm) |
|---|---|---|---|---|---|
| value | 7.31 | −4.62 | 3.56 | 4.95 | 3.29 |

Figure 24A:
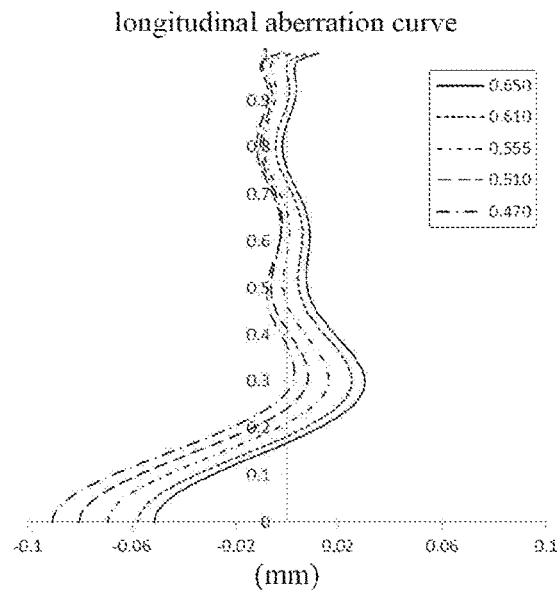
FIGS. 24A-24D respectively illustrate a longitudinal aberration curve, an astigmatic curve, a distortion curve, and a lateral color curve of the camera lens group according to the twelfth embodiment.
Figure 24B:
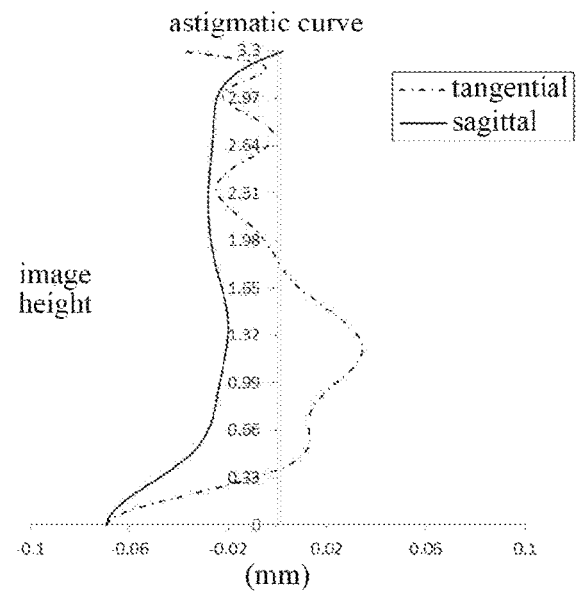
Figure 24C:
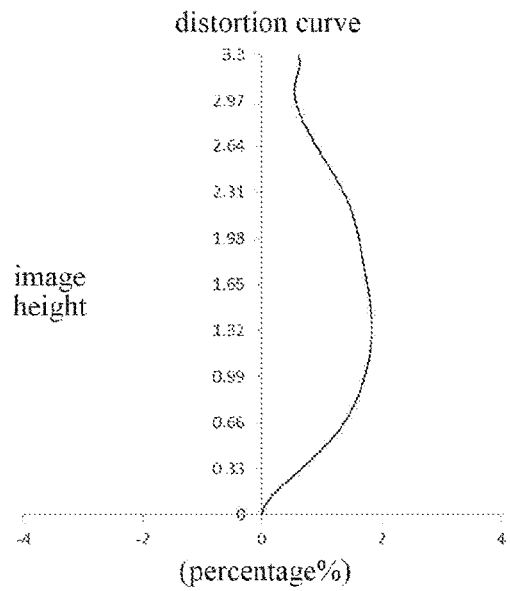
Figure 24D:
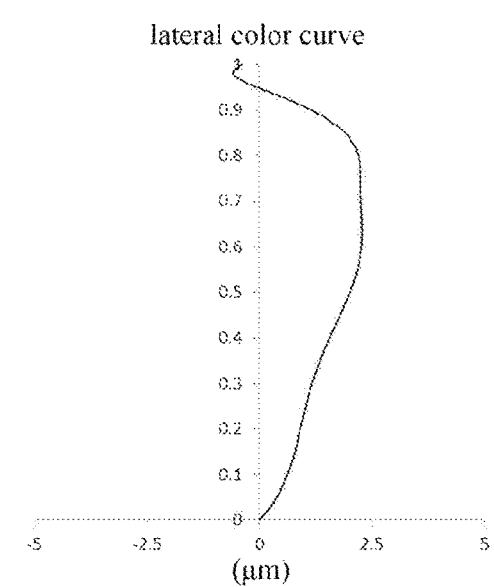

FIG. 24A shows the longitudinal aberration curve of the camera lens group according to the twelfth embodiment, representing deviations of focal points of light of different wavelengths converged after passing through the lens group. FIG. 24B shows the astigmatic curve of the camera lens group according to the twelfth embodiment, representing a curvature of the tangential image plane and a curvature of the sagittal image plane. FIG. 24C shows the distortion curve of the camera lens group according to the twelfth embodiment, representing amounts of distortion at different viewing angles. FIG. 24D shows the lateral color curve of the camera lens group according to the twelfth embodiment, representing deviations of different image heights on the image plane after light passes through the lens group. It can be seen from FIG. 24A to FIG. 24D that the camera lens group given in the twelfth embodiment may achieve a good imaging quality.

To sum up, the first embodiment to the twelfth embodiment respectively satisfy the relationships shown in Table 37 below.

TABLE 37

| conditional expression | embodiment | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| f/EPD | 1.59 | 1.59 | 1.59 | 1.60 | 1.59 | 1.59 | 1.54 | 1.59 | 1.59 | 1.59 | 1.65 | 1.65 |
| CT4/CT5 | 2.33 | 2.33 | 2.47 | 2.48 | 2.46 | 2.52 | 2.33 | 2.50 | 2.27 | 2.36 | 1.64 | 1.75 |
| f2/f | 1.40 | 0.86 | 0.89 | 0.89 | 0.88 | 0.88 | 0.80 | 0.88 | 1.24 | 1.27 | 1.00 | 1.22 |
| f5/R10 | 1.26 | −1.54 | −0.34 | 0.41 | 0.45 | −0.74 | −0.15 | −0.57 | 1.38 | 1.31 | 14.03 | 21.08 |
| (R7 + R8)/(R7 − R8) | 0.29 | 1.10 | 1.15 | 1.18 | 1.20 | 1.08 | 1.50 | 1.11 | 0.28 | 0.29 | 0.62 | 0.54 |
| ΣCT/TTL | 0.55 | 0.55 | 0.56 | 0.56 | 0.56 | 0.55 | 0.56 | 0.55 | 0.56 | 0.56 | 0.59 | 0.60 |
| T67/T56 | 9.29 | 5.80 | 6.57 | 13.77 | 13.69 | 7.04 | 4.36 | 5.70 | 8.49 | 8.73 | 6.14 | 6.10 |
| R6/R4 | 0.52 | −0.11 | −0.05 | −0.08 | −0.10 | −0.08 | −0.11 | −0.09 | 0.38 | 0.39 | 0.38 | 0.59 |
| f/R9 | −2.10 | 0.01 | −0.55 | −1.15 | −1.08 | −0.38 | −0.54 | −0.51 | −2.17 | −2.19 | −3.11 | −3.05 |
| |R11 + R12|/|R11 − R12| | 2.11 | 2.62 | 2.90 | 2.92 | 3.16 | 2.53 | 2.18 | 2.06 | 1.79 | 1.86 | 2.17 | 2.50 |

TABLE 37-continued

| conditional expression | embodiment | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| f4/f6 | 1.72 | 0.99 | 0.92 | 1.08 | 1.01 | 1.18 | 1.19 | 1.17 | 1.89 | 1.79 | 1.09 | 1.01 |
| f7/f2 | −1.04 | −0.84 | −0.79 | −0.79 | −0.81 | −0.81 | −0.85 | −0.80 | −1.21 | −1.19 | −1.14 | −1.06 |
| TTL/ImgH | 1.50 | 1.40 | 1.40 | 1.40 | 1.40 | 1.40 | 1.40 | 1.40 | 1.55 | 1.55 | 1.54 | 1.50 |
| R12/R11 | 2.80 | 2.23 | 2.05 | 2.04 | 1.93 | 2.31 | 2.70 | 2.89 | 3.53 | 3.33 | 2.72 | 2.33 |

The present disclosure further provides a camera device, having a photosensitive element which may be a photosensitive charge-coupled device (CCD) or a complementary metal-oxide semiconductor (CMOS) element. The camera device may be an independent camera device such as a digital camera, or may be a camera module integrated in a mobile electronic device such as a mobile phone. The camera device is equipped with the camera lens group described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar function.

What is claimed is:

1. A camera lens group comprising, sequentially along an optical axis from an object side to an image side: a first lens, a second lens, a third lens, a fourth lens, a fifth lens, a sixth lens, and a seventh lens having refractive powers, wherein,
    the second lens has a positive refractive power, and an object-side surface of the second lens is a convex surface;
    an object-side surface of the third lens is a convex surface, and an image-side surface of the third lens is a concave surface;
    an object-side surface of the sixth lens is a convex surface, and an image-side surface of the sixth lens is a concave surface;
    an image-side surface of the seventh lens is a concave surface; and
    a center thickness CT4 of the fourth lens on the optical axis and a center thickness CT5 of the fifth lens on the optical axis satisfy: CT4/CT5>1.5,
    wherein a total effective focal length f of the camera lens group and an entrance pupil diameter EPD of the camera lens group satisfy: f/EPD≤1.65, and
    wherein an axial distance TTL from an object-side surface of the first lens to an image plane of the camera lens group and half of a diagonal length ImgH of an effective pixel area on the image plane of the camera lens group satisfy: TTL/ImgH≤1.60.

2. The camera lens group according to claim 1, wherein an effective focal length f2 of the second lens and the total effective focal length f of the camera lens group satisfy: 0.5<f2/f<1.5.

3. The camera lens group according to claim 1, wherein the seventh lens has a negative refractive power, and an effective focal length f7 of the seventh lens and an effective focal length f2 of the second lens satisfy: −1.5<f7/f2<−0.5.

4. The camera lens group according to claim 1, wherein a radius of curvature R6 of the image-side surface of the third lens and a radius of curvature R4 of an image-side surface of the second lens satisfy: −0.5<R6/R4<0.8.

5. The camera lens group according to claim 1, wherein a radius of curvature R7 of an object-side surface of the fourth lens and a radius of curvature R8 of an image-side surface of the fourth lens satisfy: 0<(R7+R8)/(R7−R8)≤1.5.

6. The camera lens group according to claim 1, wherein a total effective focal length f of the camera lens group and a radius of curvature R9 of an object-side surface of the fifth lens satisfy: −3.5<f/R9<0.5.

7. The camera lens group according to claim 1, wherein an effective focal length f5 of the fifth lens and a radius of curvature R10 of an image-side surface of the fifth lens satisfy: −2<f5/R10<22.

8. The camera lens group according to claim 1, wherein a radius of curvature R11 of the object-side surface of the sixth lens and a radius of curvature R12 of the image-side surface of the sixth lens satisfy: 1.5<|R11+R12|/|R11−R12|<3.5.

9. The camera lens group according to claim 1, wherein a radius of curvature R12 of the image-side surface of the sixth lens and a radius of curvature R11 of the object-side surface of the sixth lens satisfy: 1.5<R12/R11<4.0.

10. The camera lens group according to claim 1, wherein a spacing distance T67 between the sixth lens and the seventh lens on the optical axis and a spacing distance T56 between the fifth lens and the sixth lens on the optical axis satisfy: 4<T67/T56<14.

11. The camera lens group according to claim 1, wherein a sum of center thickness ΣCT of each of the first lens to the seventh lens on the optical axis and an axial distance TTL from an object-side surface of the first lens to an image plane of the camera lens group satisfy: 0.5≤ΣCT/TTL≤0.7.

12. A camera lens group comprising, sequentially along an optical axis from an object side to an image side: a first lens, a second lens, a third lens, a fourth lens, a fifth lens, a sixth lens, and a seventh lens having refractive powers, wherein,
    an object-side surface of the second lens is a convex surface;
    an object-side surface of the third lens is a convex surface, and an image-side surface of the third lens is a concave surface;
    an object-side surface of the sixth lens is a convex surface, and an image-side surface of the sixth lens is a concave surface;
    an image-side surface of the seventh lens is a concave surface; and
    an effective focal length f4 of the fourth lens and an effective focal length f6 of the sixth lens satisfy: 0.5<f4/f6<2, wherein a total effective focal length f of the camera lens group and an entrance pupil diameter EPD of the camera lens group satisfy: f/EPD≤1.65, and wherein an axial distance TTL from an object-side surface of the first lens to an image plane of the camera lens group and half of a diagonal length ImgH of an effective pixel area on the image plane of the camera lens group satisfy: TTL/ImgH≤1.60.

13. The camera lens group according to claim 12, wherein an effective focal length f2 of the second lens and a total effective focal length f of the camera lens group satisfy: 0.5<f2/f<1.5.

14. The camera lens group according to claim 12, wherein the seventh lens has a negative refractive power, and an effective focal length f7 of the seventh lens and an effective focal length f2 of the second lens satisfy: −1.5<f7/f2<−0.5.

15. The camera lens group according to claim 12, wherein a radius of curvature R6 of the image-side surface of the third lens and a radius of curvature R4 of an image-side surface of the second lens satisfy: −0.5<R6/R4<0.8.

16. The camera lens group according to claim 12, wherein a sum of center thickness ΣCT of each of the first lens to the seventh lens on the optical axis and an axial distance TTL from an object-side surface of the first lens to an image plane of the camera lens group satisfy: 0.5≤ΣCT/TTL≤0.7.

17. The camera lens group according to claim 16, wherein a spacing distance T67 between the sixth lens and the seventh lens on the optical axis and a spacing distance T56 between the fifth lens and the sixth lens on the optical axis satisfy: 4<T67/T56<14.

* * * * *